United States Patent
LaTorre et al.

(10) Patent No.: US 11,851,889 B2
(45) Date of Patent: *Dec. 26, 2023

(54) POLYMER MODIFIED ASPHALT ROOFING MATERIAL

(71) Applicant: Owens Corning Intellectual Capital, LLC, Toledo, OH (US)

(72) Inventors: Carmen Anthony LaTorre, Westerville, OH (US); Jacob Paul Honsvick, Perrysburg, OH (US); Christopher Patrick Kasprzak, Holland, OH (US); Daniel James Buckwalter, Howard, OH (US); Edward R. Harrington, Toledo, OH (US); Jonathan Ross Davis, Granville, OH (US); Laurand Henry Lewandowski, Newark, OH (US); David Michael Ploense, Downers Grove, IL (US); William Edwin Smith, Pataskala, OH (US); Scott W. Schweiger, Newark, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/530,576

(22) Filed: Nov. 19, 2021

(65) Prior Publication Data

US 2022/0081907 A1   Mar. 17, 2022

Related U.S. Application Data

(63) Continuation of application No. 16/884,304, filed on May 27, 2020, which is a continuation of application
(Continued)

(51) Int. Cl.
*E04D 1/20* (2006.01)
*E04D 1/34* (2006.01)
(Continued)

(52) U.S. Cl.
CPC .............. *E04D 7/005* (2013.01); *C08K 3/013* (2018.01); *C08K 5/01* (2013.01); *C08L 95/00* (2013.01);
(Continued)

(58) Field of Classification Search
CPC ........... E04D 1/26; E04D 1/14; E04D 12/002; E04D 2001/3452; E04D 2001/3458;
(Continued)

(56) References Cited

U.S. PATENT DOCUMENTS 4,382,989 A   5/1983   Chang et al.
5,195,290 A   3/1993   Hulett
(Continued)

FOREIGN PATENT DOCUMENTS

CA        2783248 A1 *  1/2013  ............... E04D 1/20
WO    2018217749 A1   11/2018

OTHER PUBLICATIONS

Office Action from U.S. Appl. No. 16/884,304 dated Apr. 5, 2022.
(Continued)

*Primary Examiner* — Phi D A
(74) *Attorney, Agent, or Firm* — Calfee, Halter & Griswold LLP

(57) ABSTRACT

A shingle coating asphalt composition is provided that is produced from a paving grade asphalt. The asphalt composition comprises a paving-grade asphalt that has been modified with one or more polymer additives; and a secondary additive comprising one or more of a viscosity reducing agent, a wax, a salt of a fatty acid ester, and an amide of a fatty acid. The shingle coating asphalt coating composition
(Continued)

is used to make a shingle. The shingle includes a substrate, the asphalt, and roofing granules.

24 Claims, 14 Drawing Sheets

Related U.S. Application Data

No. 16/222,113, filed on Dec. 17, 2018, now abandoned.

(60) Provisional application No. 62/724,417, filed on Aug. 29, 2018, provisional application No. 62/599,406, filed on Dec. 15, 2017.

(51) Int. Cl.
| | |
|---|---|
| *E04D 7/00* | (2006.01) |
| *E04D 1/30* | (2006.01) |
| *C08K 5/01* | (2006.01) |
| *C08L 95/00* | (2006.01) |
| *C09D 195/00* | (2006.01) |
| *E04D 1/26* | (2006.01) |
| *E04D 1/28* | (2006.01) |
| *C08K 3/013* | (2018.01) |
| *E04D 12/00* | (2006.01) |
| *C08L 9/06* | (2006.01) |
| *E04D 1/00* | (2006.01) |

(52) U.S. Cl.
CPC ............. *C09D 195/00* (2013.01); *E04D 1/20* (2013.01); *E04D 1/26* (2013.01); *E04D 1/28* (2013.01); *E04D 1/30* (2013.01); *E04D 1/34* (2013.01); *C08L 9/06* (2013.01); *C08L 2555/72* (2013.01); *C08L 2555/84* (2013.01); *E04D 12/002* (2013.01); *E04D 2001/005* (2013.01); *E04D 2001/347* (2013.01); *E04D 2001/3423* (2013.01); *E04D 2001/3467* (2013.01); *E04D 2001/3482* (2013.01); *E04D 2001/3491* (2013.01)

(58) Field of Classification Search
CPC ....... E04D 2001/005; E04D 1/20; E04D 1/22; E04D 1/28
See application file for complete search history.

(56) References Cited

U.S. PATENT DOCUMENTS

| | | | |
|---|---|---|---|
| 5,451,621 A | 9/1995 | Usmani et al. | |
| 5,711,796 A | 1/1998 | Grzybowski et al. | |
| 6,044,608 A | 4/2000 | Stahl et al. | |
| 6,120,913 A | 9/2000 | Kluttz et al. | |
| 6,134,856 A | 10/2000 | Khan et al. | |
| 6,145,265 A | 11/2000 | Malarkey et al. | |
| 6,148,578 A | 11/2000 | Nowacek et al. | |
| 6,408,593 B1 | 6/2002 | Foster et al. | |
| 6,426,309 B1 | 7/2002 | Miller et al. | |
| 6,696,125 B2 | 2/2004 | Zanchetta et al. | |
| 6,924,015 B2 | 8/2005 | Zanchetta et al. | |
| 6,936,329 B2 | 8/2005 | Kiik et al. | |
| 6,962,738 B2 | 11/2005 | Swann | |
| 7,048,990 B2 | 5/2006 | Koschitzky | |
| 7,281,358 B2 | 10/2007 | Floyd | |
| 7,442,658 B2 | 10/2008 | Rodrigues et al. | |
| 7,569,627 B2 | 8/2009 | Dean | |
| 7,576,148 B2 | 8/2009 | Kluttz et al. | |
| 7,595,356 B2 | 9/2009 | Lommerts et al. | |
| 7,696,267 B2 | 4/2010 | Sasagawa et al. | |
| 7,776,417 B2 | 8/2010 | Mohseen et al. | |
| 7,833,339 B2 | 11/2010 | Whitaker et al. | |
| 7,857,904 B2 | 12/2010 | Trumbore et al. | |
| 7,906,204 B2 | 3/2011 | Bindschedler et al. | |
| 7,977,259 B2 | 7/2011 | Ratcliff et al. | |
| 8,034,172 B2 | 10/2011 | Naidoo et al. | |
| 8,034,854 B2 | 10/2011 | Marzouki | |
| 8,198,350 B2 | 6/2012 | Fee et al. | |
| 8,211,528 B2 | 7/2012 | Aschenbeck et al. | |
| 8,277,949 B2 | 10/2012 | Smith | |
| 8,430,983 B2 | 4/2013 | Vermilion et al. | |
| 8,530,034 B2 | 9/2013 | Khan et al. | |
| 8,607,521 B2 | 12/2013 | Belt et al. | |
| 8,696,806 B2 | 4/2014 | Williams et al. | |
| 8,697,781 B2 | 4/2014 | Italia et al. | |
| 8,713,883 B2 | 5/2014 | Thies, III | |
| 8,753,442 B2 | 6/2014 | Trumbore et al. | |
| 8,765,847 B2 | 7/2014 | Moran et al. | |
| 8,771,413 B2 | 7/2014 | Ranka et al. | |
| 8,802,215 B2 | 8/2014 | Kalkanoglu et al. | |
| 8,906,152 B2 | 12/2014 | Martin | |
| 9,010,058 B2 | 4/2015 | Dejarnette et al. | |
| 9,021,760 B2 | 5/2015 | Kiik et al. | |
| 9,259,860 B2 | 2/2016 | Kalkanoglu et al. | |
| 9,353,526 B2 | 5/2016 | Kalkanoglu et al. | |
| 9,469,764 B2 | 10/2016 | Puhala et al. | |
| 9,482,007 B2 | 11/2016 | Grubka et al. | |
| 9,493,653 B2 | 11/2016 | Rowe et al. | |
| 9,493,654 B2 | 11/2016 | Stephens et al. | |
| 9,527,970 B2 | 12/2016 | Pochert | |
| 9,605,152 B2 | 3/2017 | Ruan et al. | |
| 9,617,424 B2 | 4/2017 | Naidoo et al. | |
| 9,631,094 B2 | 4/2017 | Rotz et al. | |
| 9,657,478 B2 | 5/2017 | Belt et al. | |
| 9,677,277 B2 | 6/2017 | Kalkanoglu et al. | |
| 9,688,883 B2 | 6/2017 | Subotic et al. | |
| 9,725,907 B2 | 8/2017 | Harrington et al. | |
| 9,834,935 B2 | 12/2017 | Loftus et al. | |
| 9,909,031 B1 | 3/2018 | Bruns et al. | |
| 10,138,633 B2 | 11/2018 | Khan et al. | |
| 10,167,639 B2 | 1/2019 | Smith et al. | |
| 10,189,656 B2 | 1/2019 | Belt et al. | |
| 10,428,524 B2 | 10/2019 | Humphreys | |
| 10,907,353 B2 | 2/2021 | LaTorre et al. | |
| 10,907,354 B2 | 2/2021 | LaTorre et al. | |
| 10,934,715 B2 | 3/2021 | LaTorre et al. | |
| 10,961,713 B2 | 3/2021 | LaTorre et al. | |
| 11,028,591 B2 | 6/2021 | LaTorre et al. | |
| 11,028,592 B2 | 6/2021 | LaTorre et al. | |
| 11,035,123 B2 | 6/2021 | LaTorre et al. | |
| 11,053,391 B2 | 7/2021 | Tibah | |
| 11,279,811 B2 | 3/2022 | DiMondo et al. | |
| 11,473,305 B2 | 10/2022 | LaTorre et al. | |
| 2007/0130863 A1 | 6/2007 | Jones | |
| 2007/0251416 A1 | 11/2007 | Dean et al. | |
| 2007/0261337 A1 | 11/2007 | Whitaker et al. | |
| 2008/0153945 A1 | 6/2008 | Prejean et al. | |
| 2009/0137705 A1 | 5/2009 | Faucon Dumont et al. | |
| 2009/0293404 A1 | 12/2009 | Belt et al. | |
| 2010/0196647 A1* | 8/2010 | Bryson | E04D 1/20 |
| | | | 52/309.3 |
| 2010/0210745 A1 | 8/2010 | McDaniel et al. | |
| 2010/0233146 A1 | 9/2010 | McDaniel | |
| 2010/0239807 A1 | 9/2010 | Grubka et al. | |
| 2011/0030761 A1 | 2/2011 | Kalkanoglu et al. | |
| 2011/0064874 A1 | 3/2011 | Khan et al. | |
| 2011/0072752 A1* | 3/2011 | Aschenbeck | B32B 11/02 |
| | | | 53/446 |
| 2011/0165376 A1 | 7/2011 | Whitaker et al. | |
| 2011/0197785 A1 | 8/2011 | Trumbore et al. | |
| 2011/0281094 A1 | 11/2011 | Zanchetta et al. | |
| 2011/0283646 A1* | 11/2011 | Vermilion | E04D 1/26 |
| | | | 52/539 |
| 2012/0064323 A1 | 3/2012 | Shoemake et al. | |
| 2012/0167802 A1 | 7/2012 | Huh | |
| 2012/0183723 A1 | 7/2012 | Srinivasan et al. | |
| 2012/0232213 A1 | 9/2012 | Shoemake et al. | |
| 2012/0302673 A1 | 11/2012 | Stephens et al. | |
| 2013/0022823 A1 | 1/2013 | Franks, Sr. | |
| 2013/0025225 A1 | 1/2013 | Vermilion et al. | |
| 2013/0042793 A1 | 2/2013 | Peregrine et al. | |
| 2013/0065020 A1 | 3/2013 | Loftus et al. | |

(56) References Cited

U.S. PATENT DOCUMENTS

| | | |
|---|---|---|
| 2013/0256939 A1 | 10/2013 | Devenney et al. |
| 2014/0322494 A1 | 10/2014 | Belt et al. |
| 2014/0325929 A1* | 11/2014 | Vermilion ............... E04D 1/26 |
| | | 52/557 |
| 2015/0105494 A1 | 4/2015 | Naidoo et al. |
| 2015/0105695 A1 | 4/2015 | Sabatino |
| 2015/0197884 A1 | 7/2015 | Zhou et al. |
| 2015/0240495 A1 | 8/2015 | Vermilion et al. |
| 2015/0322263 A1 | 11/2015 | Hilsenbeck |
| 2015/0361318 A1 | 12/2015 | Crews et al. |
| 2015/0368470 A1 | 12/2015 | Huh |
| 2016/0017148 A1 | 1/2016 | Ruan et al. |
| 2016/0053150 A1 | 2/2016 | Croteau et al. |
| 2016/0244971 A1 | 8/2016 | Belt et al. |
| 2016/0376440 A1 | 12/2016 | Naidoo et al. |
| 2017/0002566 A1 | 1/2017 | Minot |
| 2018/0002570 A1 | 1/2018 | Aerts et al. |
| 2018/0022645 A1 | 1/2018 | Aerts et al. |
| 2018/0051465 A1 | 2/2018 | Grubka et al. |
| 2018/0112074 A1 | 4/2018 | Tibah |
| 2018/0119424 A1 | 5/2018 | Khan et al. |
| 2018/0230291 A1 | 8/2018 | Albertelli et al. |
| 2018/0346658 A1 | 12/2018 | Le et al. |
| 2018/0363252 A1 | 12/2018 | Kriech et al. |
| 2019/0186144 A1 | 6/2019 | Atorre et al. |
| 2020/0165458 A1 | 5/2020 | Colliat et al. |

OTHER PUBLICATIONS

Office Action from U.S. Appl. No. 16/952,208 dated Mar. 24, 2022.
International Search Report and Written Opinion from PCT/US2018/065945 dated Jun. 20, 2019.
Office Action from U.S. Appl. No. 16/222,113 dated Oct. 1, 2019.
Office Action from U.S. Appl. No. 16/222,113 dated Jan. 9, 2020.
Office Action from U.S. Appl. No. 16/222,113 dated Jun. 9, 2020.
Office Action from U.S. Appl. No. 16/222,113 dated Nov. 23, 2020.
Office Action from U.S. Appl. No. 16/222,113 dated Mar. 25, 2021.
Notice of Allowance from U.S. Appl. No. 16/222,113 dated Jun. 25, 2021.
Office Action from U.S. Appl. No. 16/222,181 dated Jan. 6, 2020.
Office Action from U.S. Appl. No. 16/222,181 dated Apr. 27, 2020.
Office Action from U.S. Appl. No. 16/222,181 dated Nov. 5, 2020.
Notice of Allowance from U.S. Appl. No. 16/222,181 dated Jan. 6, 2021.
Office Action from U.S. Appl. No. 16/222,223 dated Oct. 4, 2019.
Office Action from U.S. Appl. No. 16/222,223 dated Mar. 3, 2020.
Notice of Allowance from U.S. Appl. No. 16/222,223 dated Jun. 17, 2020.
Notice of Allowance from U.S. Appl. No. 16/222,223 dated Sep. 8, 2020.
Office Action from U.S. Appl. No. 16/222,234 dated Sep. 19, 2019.
Office Action from U.S. Appl. No. 16/222,234 dated Feb. 18, 2020.
Office Action from U.S. Appl. No. 16/222,234 dated May 28, 2020.
Notice of Allowance from U.S. Appl. No. 16/222,234 dated Nov. 12, 2020.
Office Action from U.S. Appl. No. 16/222,239 dated Oct. 4, 2019.
Office Action from U.S. Appl. No. 16/222,239 dated Mar. 3, 2020.
Notice of Allowance from U.S. Appl. No. 16/222,239 dated Jun. 16, 2020.
Notice of Allowance from U.S. Appl. No. 16/222,239 dated Aug. 20, 2020.
Office Action from U.S. Appl. No. 16/222,251 dated Jan. 6, 2020.
Office Action from U.S. Appl. No. 16/222,251 dated Apr. 29, 2020.
Office Action from U.S. Appl. No. 16/222,251 dated Nov. 18, 2020.
Notice of Allowance from U.S. Appl. No. 16/222,251 dated Feb. 25, 2021.
Office Action from U.S. Appl. No. 16/222,257 dated Jan. 6, 2020.
Office Action from U.S. Appl. No. 16/222,257 dated Apr. 28, 2020.
Office Action from U.S. Appl. No. 16/222,257 dated Nov. 17, 2020.
Notice of Allowance from U.S. Appl. No. 16/222,257 dated Feb. 24, 2021.
Office Action from U.S. Appl. No. 16/222,262 dated Jan. 6, 2020.
Office Action from U.S. Appl. No. 16/222,262 dated Apr. 28, 2020.
Office Action from U.S. Appl. No. 16/222,262 dated Nov. 18, 2020.
Notice of Allowance from U.S. Appl. No. 16/222,262 dated Feb. 26, 2021.
Office Action from U.S. Appl. No. 16/884,304 dated Jan. 7, 2021.
Office Action from U.S. Appl. No. 16/884,304 dated Jun. 14, 2021.
Office Action from U.S. Appl. No. 16/952,208 dated Oct. 5, 2021.
Office Action from U.S. Appl. No. 16/222,113 dated Feb. 16, 2022.
Office Action from U.S. Appl. No. 16/884,304 dated Jan. 5, 2022.
Office Action from U.S. Appl. No. 16/884,304 dated Oct. 6, 2022.
Office Action from U.S. Appl. No. 16/222,113 dated Dec. 21, 2022.
Office Action from MX Application No. MX/a/2020/006278 dated Mar. 1, 2023.
Office Action from U.S. Appl. No. 16/884,304 dated Feb. 2, 2023.
Notice of Allowance from U.S. Appl. No. 16/952,208 dated Jul. 14, 2022.
Office Action from U.S. Appl. No. 16/222,113 dated Sep. 13, 2022.
Office Action from CA Application No. 3,027,820 dated Sep. 11, 2023.

* cited by examiner

POLYMER MODIFIED ASPHALT ROOFING MATERIAL

RELATED APPLICATIONS

This application is a continuation of U.S. Non-Provisional application Ser. No. 16/884,304, filed on May 27, 2020, which is a continuation of U.S. Non-Provisional application Ser. No. 16/222,113, filed on Dec. 17, 2018, which claims the benefit of U.S. Provisional Application No. 62/599,406, filed Dec. 15, 2017, and U.S. Provisional Application No. 62/724,417, filed Aug. 29, 2018, all of which are incorporated herein by reference in their entireties.

BACKGROUND

Asphalt-based roofing materials, such as roofing shingles, roll roofing, and commercial roofing, are installed on the roofs of buildings to provide protection from the elements and to give the roof an aesthetically pleasing look. Typically, the roofing material is constructed of a substrate such as a glass fiber mat or an organic felt, an asphalt coating on the substrate, and a protective and/or decorative surface layer of granules of stone, mineral, sand or other particulate material is embedded in the tacky asphalt coating.

A common method for the manufacture of asphalt shingles is the production of a continuous sheet of asphalt material followed by a shingle cutting operation which cuts the material into individual shingles. In the production of asphalt sheet material, either a glass fiber mat or an organic felt mat is passed through a coater containing hot liquid asphalt filled with limestone to form a tacky, asphalt coated sheet. Subsequently, the hot asphalt coated sheet is passed beneath one or more granule applicators which discharge protective and decorative surface granules onto portions of the asphalt sheet material.

In certain types of shingles, it is especially desired that the shingles define a sufficiently wide area, often known in the industry as the "nail zone," in order to make installation of roofs using shingles, such as laminated shingles, more efficient and secure. One or more lines or other indicia painted or otherwise marked longitudinally on the surface of the shingle may define such a nail zone. It is especially desired that the shingles define a nail zone that guides installers in the placement of nails.

Additionally, shingles may experience lift in high wind situations. This lift may be exacerbated if the shingle tabs are not sealed or adhered to the shingle below. Therefore, there is also a need for shingles that have a sufficiently high nail pull-through value so that the installed shingles have improved performance in high wind situations.

Historically, coating asphalt for roofing shingles has been produced by choosing a special grade of asphalt as the feedstock to the air blowing process in order to meet these properties. These special grades of asphalt were often materials that were softer (higher penetration, lower viscosity) than paving grade asphalt and were often called "roofer's flux". Unfortunately, these special grades of asphalts that can be air-blown to make coating asphalts are increasingly in short supply and therefore can be costly compared to many other types of asphalts, particularly commodity paving asphalts.

SUMMARY

A shingle coating asphalt composition is provided that is produced from a paving grade asphalt. The asphalt composition comprises a paving-grade asphalt that has been modified with one or more polymer additives; and a secondary additive comprising one or more of a viscosity reducing agent, a wax, a salt of a fatty acid ester, and an amide of a fatty acid. The shingle coating asphalt coating composition is used to make a shingle. The shingle includes a substrate, the asphalt, and roofing granules.

BRIEF DESCRIPTION OF THE DRAWINGS

Exemplary embodiments of the disclosure will be apparent from the more particular description of certain example embodiments provided below and as illustrated in the accompanying drawings.

DETAILED DESCRIPTION

Figure 1:
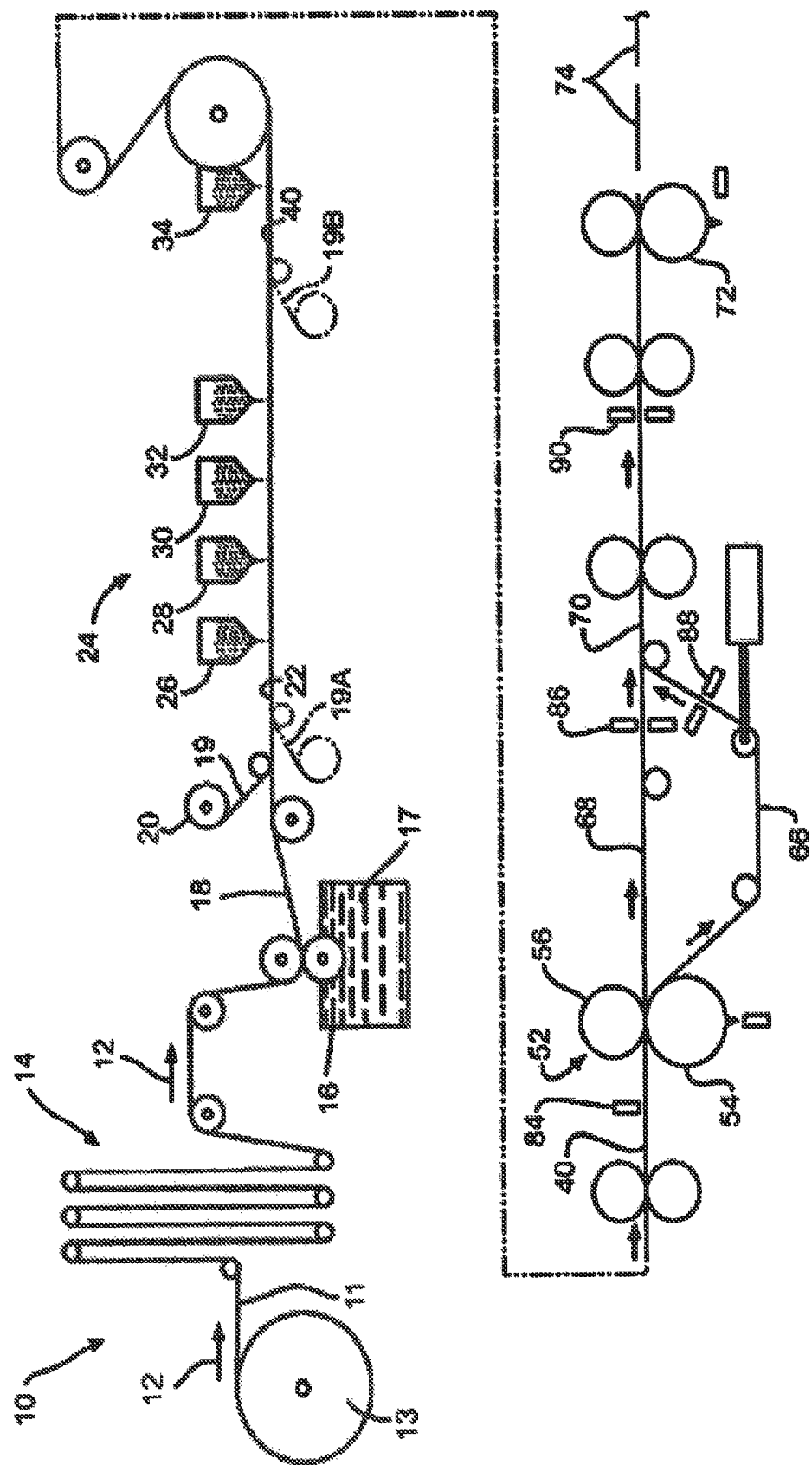
FIG. 1 is a schematic elevational view of an apparatus for manufacturing shingles.

The present invention will now be described with occasional reference to the illustrated embodiments of the invention. This invention may, however, be embodied in different forms and should not be construed as limited to the embodiments set forth herein, nor in any order of preference. Rather, these embodiments are provided so that this disclosure will be more thorough, and will convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

As used in the description of the invention and the appended claims, the term "longitudinal" or "longitudinally" is defined as substantially parallel with the machine direction.

As used in the description of the invention and the appended claims, the terms "shingle blow off" or "blow off" are defined as the occurrence of installed shingles being forced off a roof deck when the installed shingles are subjected to high winds. Also, the term "shingle blow through" or "blow through" are defined as the situation that occurs when a nail has been driven too deeply into the shingle and the nail head penetrates through at least the shingle overlay.

As used in the description of the invention and the appended claims, the term "wet" or "wet out" is defined as the ability of sealant or adhesive to flow and/or reflow over a surface to maximize bond strength based on a larger contact area.

As used in the description of the invention and the appended claims, the term "waywind" is defined as fibers, or strips of material or fabric that are collected, applied to, or wound on a spool or bobbin in a pattern that changes the angle of the material relative to the longitudinal axis of the spool.

Composite shingles, such as asphalt shingles, are a commonly used roofing product. One example of a composite shingle is disclosed in U.S. Pat. No. RE46,177, which is incorporated herein by reference in its entirety. Asphalt shingle production generally includes feeding a base material from an upstream roll and coating it first with a roofing asphalt material, then a layer of granules. The base material is typically made from a fiberglass mat provided in a continuous shingle membrane or sheet. It should be understood that the base material may be any suitable support material.

Composite shingles may have a headlap region and a prime region. The headlap region may be ultimately covered by adjacent shingles when installed upon a roof. The prime region will be ultimately visible when the shingles are installed upon a roof.

The granules deposited on the composite material shield the roofing asphalt material from direct sunlight, offer resistance to fire, and provide texture and color to the shingle. The granules generally involve at least two different types of granules. Headlap granules are applied to the headlap region. Headlap granules are relatively low in cost and primarily serve the functional purposes of covering the underlying asphalt material for a consistent shingle construction, balancing sheet weight, and preventing overlapping shingles from sticking to one another. Colored granules or other prime granules are relatively expensive and are applied to the shingle at the prime regions. Prime granules are disposed upon the asphalt strip for both the functional purpose of protecting the underlying asphalt strip and for providing an aesthetically pleasing appearance of the roof.

The performance of an installed shingle, such as in high wind conditions, may be enhanced by reinforcing the nail zone of the shingle. By reinforcing the nail zone, the occurrence of nail blow through during shingle installation may be reduced. Reducing the occurrence of nail blow through advantageously reduces the possibility of a roof leak if water travels under the shingle tab. A reinforced nail zone also improves the efficiency of the shingle installer by reducing the likelihood of nail blow through when the shingle is weakened due to high temperatures, such as when the roof or shingle temperature is above about 120 degrees F., or when nail gun air pressure is too high. The reinforced nail zone may also provide a defined and relatively wide area in which the installer may nail. Advantageously, the reinforced nail zone will increase the force required to pull a nail through the shingle, thereby reducing the likelihood of shingle blow off.

The nail zone may also be used as the bonding substrate area or bonding surface for tab sealant bonded to the underside of the tabs of the overlay sheet. The nail zone may provide an improved bonding surface for tab sealant.

It is known that most debonding energy, such as is generated between the tab sealant and the bonding surface is due to viscoelastic loss in the tab sealant as it is stretched during debonding. Further, the polymer modified asphalt sealants typically used as tab sealants on shingles may lose their viscoelastic characteristics when the temperature drops to 40 degrees F. or below.

Advantageously, the use of woven or non-woven fabric to reinforce the nail zone and to define the bonding surface for tab sealant has been shown to improve or retain debonding loads of polymer modified asphalt sealants relative to shingles without a reinforced nail zone at relatively low temperatures, such as temperatures below about 40 degrees F. This relatively strong debonding load between woven or non-woven fabric and modified asphalt sealants, including polymer and non-polymer modified asphalt tab sealants, occurs because the woven or non-woven fabric mechanically bonds to the sealant. For example, mechanical attachment occurs as the polymer modified asphalt sealant flows around individual filaments and fiber bundles within the woven or non-woven fabric during bonding. The energy required to debond the polymer modified asphalt sealant from the woven or non-woven fabric is increased or comparable to the energy required to debond the polymer modified asphalt sealant from a shingle without a reinforced nail zone. Because the tab sealant is reinforced with the filaments and fiber bundles within the woven or non-woven fabric at the interface between the polymer modified asphalt sealant and the woven or non-woven fabric, the interior of the sealant becomes the weakest portion of the bond.

An additional advantage of using woven or non-woven fabric to reinforce the nail zone is that the fabric may be installed during shingle production. During shingle production, the woven or non-woven fabric may be pushed into the hot, filled-asphalt coating, such that some of the filled-asphalt bleeds up and around the individual fibers and fiber bundles of the fabric. This creates a positive mechanical bond between the fabric and the shingle substrate. Further, the filled-asphalt that bleeds up and into the fabric aids in forming a bond between the tab sealant and the shingle because the filled-asphalt diffuses into the tab sealant. When installed on a roof, this creates a robust continuous path for the transfer of debonding loads from the tab above to the nail in the shingle below.

Referring now to the drawings, there is shown in FIG. 1 an apparatus 10 for manufacturing an asphalt-based roofing material according to the invention. The illustrated manufacturing process involves passing a continuous sheet of substrate or shingle mat 11 in a machine direction 12 through a series of manufacturing operations. The mat 11 usually moves at a speed of at least about 200 feet/minute (61 meters/minute), and typically at a speed within the range of between about 450 feet/minute (137 meters/minute) and about 800 feet/minute (244 meters/minute). The sheet, however, may move at any desired speed.

In a first step of the manufacturing process, the continuous sheet of shingle mat 11 is payed out from a roll 13. The shingle mat 11 may be any type known for use in reinforcing asphalt-based roofing materials, such as a nonwoven web of glass fibers. Alternatively, the substrate may be a scrim or felt of fibrous materials such as mineral fibers, cellulose fibers, rag fibers, mixtures of mineral and synthetic fibers, or the like.

The sheet of shingle mat 11 is passed from the roll 13 through an accumulator 14. The accumulator 14 allows time for splicing one roll 13 of substrate to another, during which time the shingle mat 11 within the accumulator 14 is fed to the manufacturing process so that the splicing does not interrupt manufacturing.

Next, the shingle mat 11 is passed through a coater 16 where a coating of asphalt 17 is applied to the shingle mat 11 to form a first asphalt-coated sheet 18. The asphalt coating 17 may be applied in any suitable manner. In the illustrated embodiment, the shingle mat 11 contacts a supply of hot, melted asphalt 17 to completely cover the shingle mat 11 with a tacky coating of asphalt 17. However, in other embodiments, the asphalt coating 17 could be sprayed on, rolled on, or applied to the shingle mat 11 by other means. Typically, the asphalt coating is highly filled with a ground mineral filler material, amounting to at least about 60 percent by weight of the asphalt/filler combination. In one embodiment, the asphalt coating 17 is in a range from about 350 .degree. F. to about 400 .degree. F. In another embodiment, the asphalt coating 17 may be more than 400 .degree. F. or less than 350 .degree. F. The shingle mat 11 exits the coater 16 as a first asphalt-coated sheet 18. The asphalt coating 17 on the first asphalt-coated sheet 18 remains hot.

A continuous strip of a reinforcement material 19, as will be described in detail herein, may then be payed out from a roll 20. The reinforcement material 19 adheres to the first asphalt-coated sheet 18 to define a second asphalt-coated sheet 22. In a first embodiment, the reinforcement material 19 is attached to the sheet 18 by the adhesive mixture of the asphalt in the first asphalt-coated sheet 18. The reinforcement material 19, however, may be attached to the sheet 18 by any suitable means, such as other adhesives. As described in detail below, the material 19 may be formed from any material for reinforcing and strengthening the nail zone of a shingle, such as, for example, paper, film, scrim material, and woven or non-woven glass fibers.

The resulting second asphalt coated sheet 22 may then be passed beneath a series of granule dispensers 24 for the application of granules to the upper surface of the second asphalt-coated sheet 22. The granule dispensers may be of any type suitable for depositing granules onto the asphalt-coated sheet. A granule dispenser that may be used is a granule valve of the type disclosed in U.S. Pat. No. 6,610,147 to Aschenbeck. The initial granule blender 26 may deposit partial blend drops of background granules of a first color blend on the tab portion of the second asphalt coated sheet 22 in a pattern that sets or establishes the trailing edge of subsequent blend drops of a second color blend (of an accent color) and a third color blend (of a different accent color). For purposes of this patent application, the first color blend and the background granules are synonymous. The use of initially applied partial blend drops to define the trailing edge of subsequent blend drops is useful where accurate or sharp leading edges are possible, but accurate trailing edges at high shingle manufacturing speeds are difficult.

As is well known in the art, blend drops applied to the asphalt-coated sheet are often made up of granules of several different colors. For example, one particular blend drop that is supposed to simulate a weathered wood appearance might actually consist of some brown granules, some dark gray granules, and some light gray granules. When these granules are mixed together and applied to the sheet in a generally uniformly mixed manner, the overall appearance of weathered wood is achieved. For this reason, the blend drops are referred to as having a color blend, which gives an overall color appearance. This overall appearance may be different from any of the actual colors of the granules in the color blend. In addition, blend drops of darker and lighter shades of the same color, such as, for example, dark gray and light gray, are referred to as different color blends rather than merely different shades of one color.

As shown in FIG. 1, the series of dispensers 24 includes four color-blend blenders 26, 28, 30, and 32. Any desired number of blenders, however, may be used. The final blender may be the background blender 34. Each of the blenders may be supplied with granules from sources of granules, not shown. After the blend drops are deposited on the second asphalt-coated sheet 22, the remaining, uncovered areas are still tacky with warm, uncovered asphalt, and the background granules from the background blender 34 will adhere to the areas that are not already covered with blend drop granules. After all the granules are deposited on the second asphalt-coated sheet 22 by the series of dispensers 24, the sheet 22 becomes a granule-covered sheet 40.

In the illustrated embodiment, the reinforcement material 19 includes an upper surface to which granules substantially will not adhere. Granules may therefore be deposited onto substantially the entire second asphalt-coated sheet 22, including the material 19, but wherein the reinforcement material 19 includes an upper surface to which granules substantially will not adhere.

The granule-covered sheet 40 may then be turned around a slate drum 44 to press the granules into the asphalt coating and to temporarily invert the sheet so that the excess granules will fall off and will be recovered and reused.

Typically, the granules applied by the background blender 34 are made up by collecting the backfall granules falling from the slate drum 44.

The granule-covered sheet 40 may subsequently be fed through a rotary pattern cutter 52, which includes a bladed cutting cylinder 54 and a backup roll 56, as shown in FIG. 1. If desired, the pattern cutter 52 may cut a series of cutouts in the tab portion of the granule-covered sheet 40, and cut a series of notches in the underlay portion of the granule-covered sheet 40.

The pattern cutter 52 may also cut the granule-covered sheet 40 into a continuous underlay sheet 66 and a continuous overlay sheet 68. The underlay sheet 66 may be directed to be aligned beneath the overlay sheet 68, and the two sheets may be laminated together to form a continuous laminated sheet 70. As shown in FIG. 1, the continuous underlay sheet 66 may be routed on a longer path than the path of the continuous overlay sheet 68. Further downstream, the continuous laminated sheet 70 may be passed into contact with a rotary length cutter 72 that cuts the laminated sheet into individual laminated shingles 74.

In order to facilitate synchronization of the cutting and laminating steps, various sensors and controls may be employed. For example, sensors, such as photo eyes 86 and 88 may be used to synchronize the continuous underlay sheet 66 with the continuous overlay sheet 68. Sensors 90 may also be used to synchronize the notches and cutouts of the continuous laminated sheet with the end cutter or length cutter 72.

In a second embodiment, the reinforcement material may be attached to a lower surface (the downwardly facing surface when viewing FIG. 1) of the mat 11, the first asphalt coated sheet 18, the second asphalt coated sheet 22, or the granule-covered sheet 40, as shown at 19A and 19B in FIG. 1. The reinforcement material 19A and 19B may be attached to the mat 11, the first asphalt coated sheet 18, the second asphalt coated sheet 22, or the granule-covered sheet 40 by any suitable means, such as hot, melted asphalt, other adhesives, or suitable fasteners. In such an embodiment, the reinforcement material 19A and 19B may be attached to the lower surface of the nail zone of either of the overlay sheet 68 or the underlay sheet 66, thereby reinforcing and strengthening the nail zone as described herein.

Figure 2:
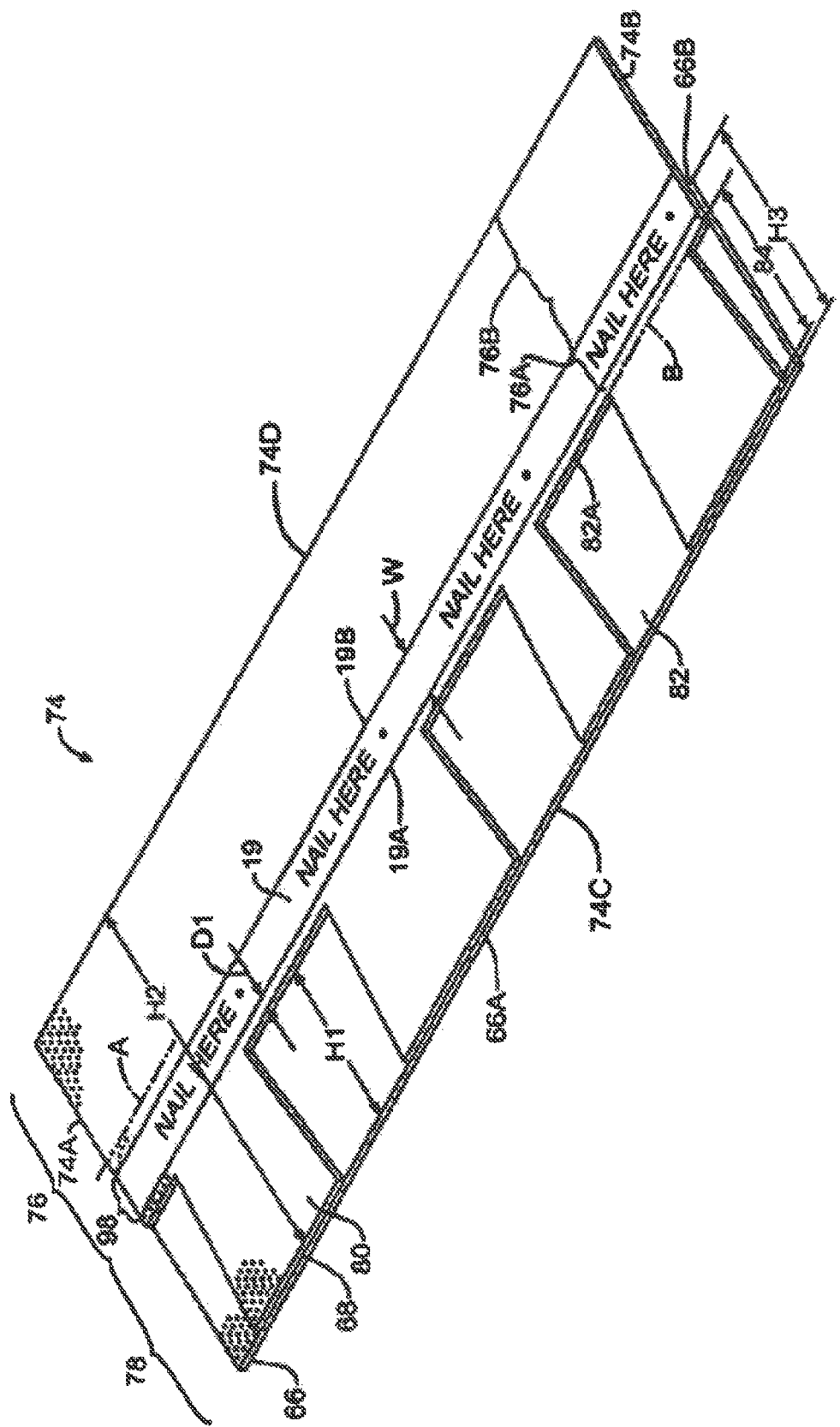
FIG. 2 is a perspective view of a first embodiment of a laminated shingle having reinforcement material.
Figure 3:
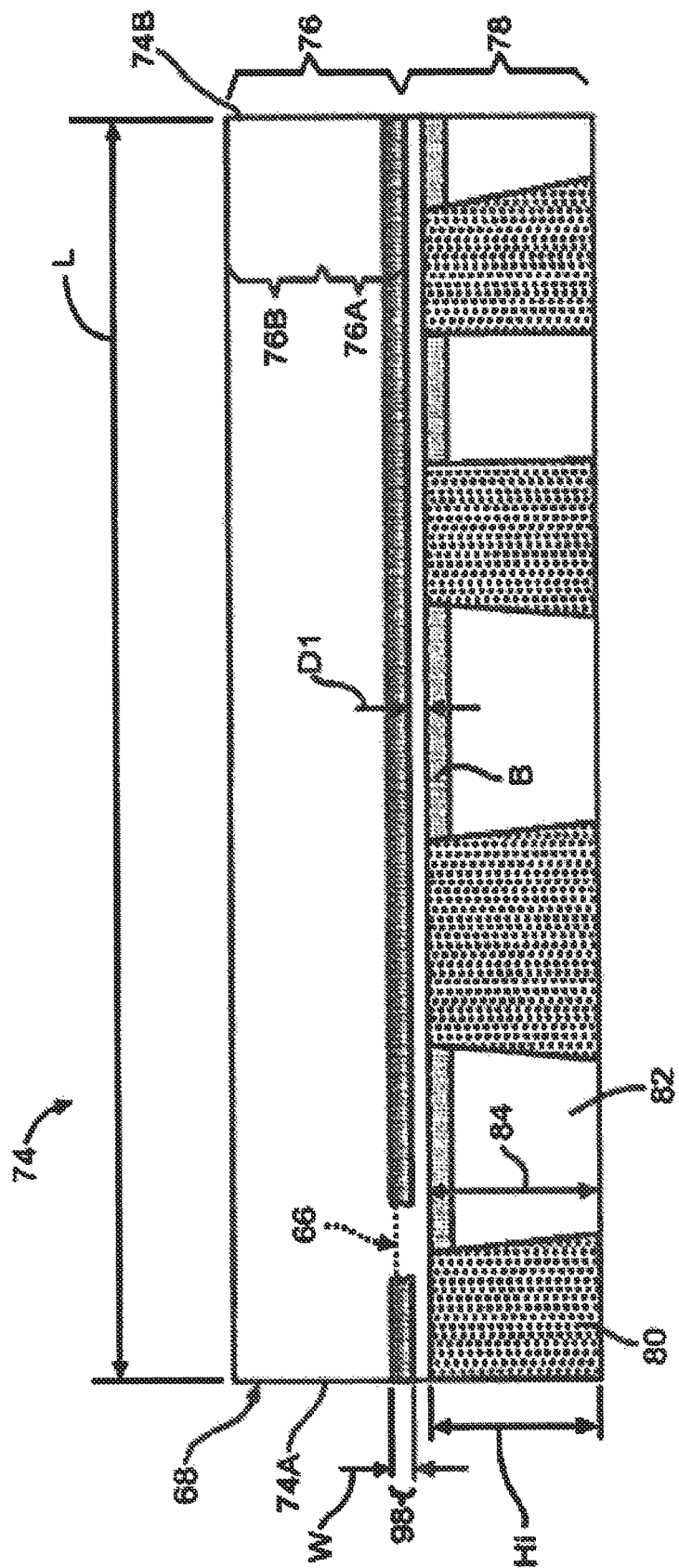
FIG. 3 is a plan view of the front of the laminated shingle illustrated in FIG. 2.
Figure 4:
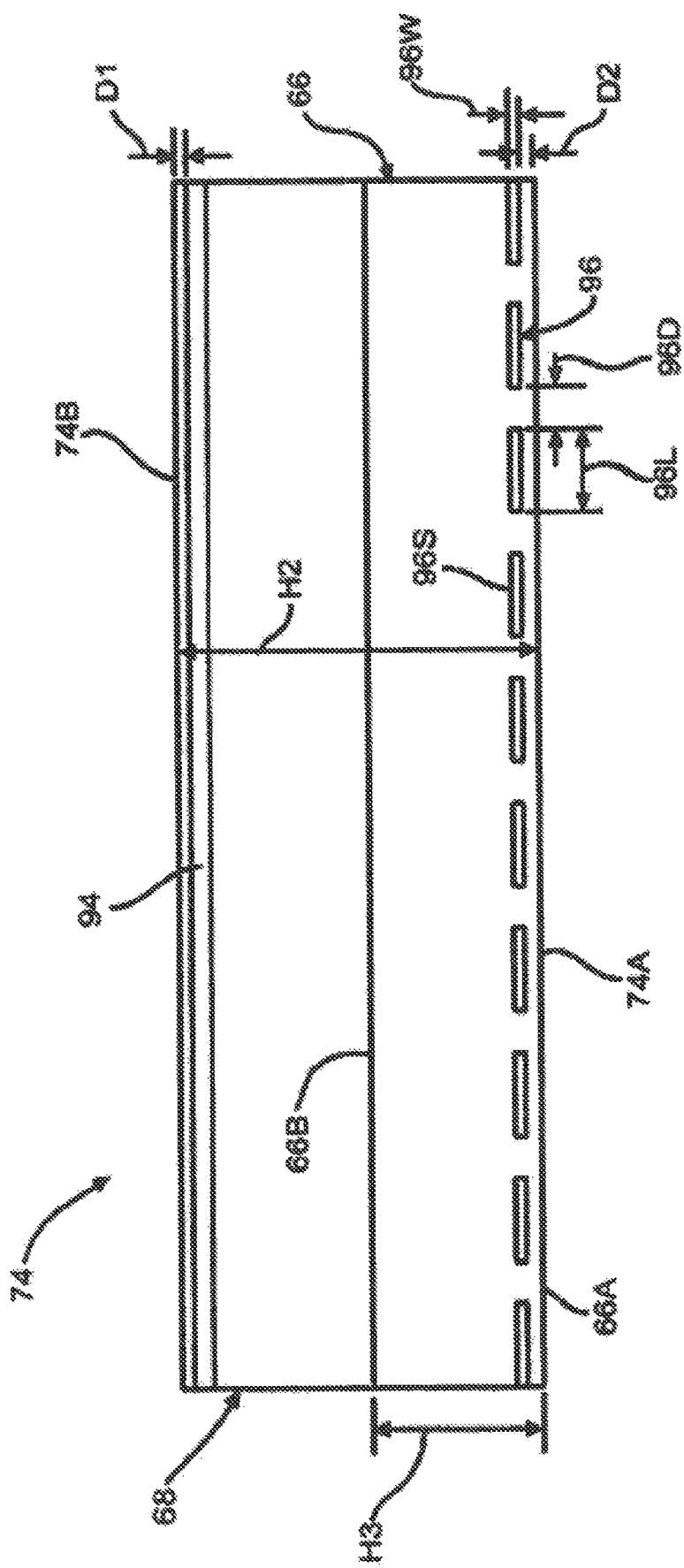
FIG. 4 is a plan view of the back of the laminated shingle illustrated in FIGS. 2 and 3.

Referring now to FIGS. 2, 3, and 4, a first embodiment of a laminated roofing shingle is shown generally at 74. In the illustrated embodiment, the shingle 74 has a length L and includes the overlay sheet 68 attached to the underlay sheet 66 and has a first end or leading edge 74C and a second end or trailing edge 74D. In the illustrated embodiment, the laminated roofing shingle 74 has a length L of about 39.375 inches. Alternatively, the length L may be within the range of from about 39.125 inches to about 39.625 inches. The shingle 74 may also be manufactured having any other desired length. The shingle 74 also includes a longitudinal axis A. The overlay sheet 68 may include a headlap portion 76 and a tab portion 78. The headlap portion 76 may include a lower zone 76A and an upper zone 76B. The tab portion 78 defines a plurality of tabs 80 and cutouts 82 between adjacent tabs 80.

In the illustrated embodiment, the tab portion 78 includes four tabs 80, although any suitable number of tabs 80 may be provided. The headlap portion 76 and the tabs 80 may include one or more granule patterns thereon. Each cutout 82 has a first height H1. In the illustrated embodiment, the cutout 82 has a first height H1 of about 5.625 inches. Alternatively, the first height H1 may be within the range of from about 5.5 inches to about 5.75 inches. In the illustrated embodiment, the cutouts 82 are shown as having the same height H1. It will be understood however, that each cutout 82 may be of different heights. A line B is collinear with an upper edge 82A of the cutouts 82 and defines an upper limit of an exposed region 84 of the underlay sheet 66. In the illustrated embodiment, the height of the exposed region 84 is equal to the first height H1, although the height of the exposed region 84 may be any desired height. In a shingle wherein the cutouts 82 have different heights, the line B may be collinear with an upper edge 82A of the cutout 82 having the largest height. In the illustrated embodiment, the overlay sheet 68 has a second height H2.

The reinforcement material 19 has a width W of about 1.0 inch. Alternatively, the width W may be within the range of from about 0.75 inch to about 1.5 inches. Additionally, the width W may be within the range of from about 0.5 inch to about 2.0 inches. The reinforcement material 19 may be disposed longitudinally on the headlap portion 76. In the illustrated embodiment, the reinforcement material 19 extends longitudinally from the first end 74A to the second end 74B of the shingle 74 within the lower zone 76A of the headlap portion 76. A lower edge 19A of the reinforcement material 19 may be spaced apart from the line B by a distance D1. In the illustrated embodiment, the distance D1 is about 0.25 inch. Alternatively, the distance D1 may be within the range of from about 0.125 inch to about 0.375 inch. The distance D1 may however, be of any other desired length. For example, if desired, the reinforcement material 19 may substantially cover the entire headlap portion 76 of the overlay sheet 68. It will be understood that the reinforcement material 19 need not extend from the first end 74A to the second end 74B of the shingle 74, and may be disposed in one or more sections or portions on the shingle 74.

The reinforcement material 19 defines a reinforced nail zone 98 and may include text such as "NAIL HERE", as shown in FIG. 2. It will be understood, however, that any other text or other indicia may be included on the reinforcement material 19. It will also be understood that the reinforcement material 19 can be provided without such text or indicia. These indicia on the reinforcement material 19 ensure that the reinforced nail zone 98 may be easily and quickly identified by the shingle installer.

In the embodiment illustrated in FIGS. 2 and 4, the underlay sheet 66 includes a leading edge 66A and a trailing edge 66B and has a third height H3. In the illustrated embodiment, the height H3 of the underlay sheet 66 is about 6.625 inches. Alternatively, the height H3 may be within the range of from about 6.5 inches to about 6.75 inches. The underlay sheet 66 may also be manufactured having any other desired height.

In the illustrated embodiment, the third height H3 of the underlay sheet 66 is equal to about one-half the second height H2 of the overlay sheet 68. The overlay sheet 68 and the underlay sheet 66 thereby overlap to define a two-layer portion of the laminated shingle 74 and a single-layer portion of the laminated shingle 74. More specifically, a region of the underlay sheet 66 overlaps a region of the headlap portion 76 of the overlay sheet 68, thereby defining a two-layer portion and a single-layer portion of the laminated shingle 74 within the headlap portion 76. At least a portion of the reinforcement material 19 is adhered to the single-layer portion of the laminated shingle 74. Alternately, the third height H3 of the underlay sheet 66 may be greater than one-half of the second height H2 of the overlay sheet 68. This relationship between the underlay sheet 66 and the overlay sheet 68 allows the reinforcement material 19 to be positioned such that a reinforced nail zone is provided at the two-layer portion of the laminated shingle 74.

Referring now to FIG. 4, a back side of the laminated shingle 74 is shown. If desired, a continuous strip of release tape 94 may extend longitudinally and may be adhered to an upper surface of the back side of the laminated shingle 74 adjacent and parallel to a trailing edge 74D of the laminated shingle 74. The release tape 94 is positioned such that it will be opposite the tab sealant 96 when the laminated shingles 74 are stacked, such as when packaged for shipment. The release tape 94 may be spaced a distance D1 from the trailing edge 74D of the laminated shingle 74. In the illustrated embodiment, the release tape 94 is spaced about 0.125 inches from the trailing edge 74D of the laminated shingle 74. Alternatively, the release tape 94 may be placed at any desired location on the back side of the laminated shingle 74, such that the release tape 94 contacts and covers the sealant 96 when a plurality of the laminated shingles 74 are stacked in a bundle, such as for shipping.

A discontinuous bead of tab sealant 96 may extend longitudinally and may be adhered to a lower surface of the back side of the laminated shingle 74 adjacent and parallel to a leading edge 74C of the laminated shingle 74. The tab sealant 96 may be spaced a distance D2 from the leading edge 74C of the laminated shingle 74. In the illustrated embodiment, the tab sealant 96 is spaced about 0.5 inches from the leading edge 74C of the laminated shingle 74. Alternatively, the tab sealant 96 may be spaced within the range of from about 0.375 inch to about 0.625 inch from the leading edge 74C of the laminated shingle 74. In the illustrated embodiment, the tab sealant 96 includes segments 96S having a length 96L of about 3.0 inches. Alternatively, the tab sealant segments 96S may have a length 96L within the range of from about 2.25 inches to about 4.25 inches. The tab sealant segments 96S may be spaced apart a distance 96D. In the illustrated embodiment, the tab sealant segments 96S are spaced about 1.0 inch apart. Alternatively, the tab sealant segments 96S may be spaced within the range of from about 0.25 inch to about 1.5 inches apart.

The tab sealant segments 96S may have a width 96W. In the illustrated embodiment, the tab sealant segments 96S have a width 96W of about 0.5 inch. Alternatively, the tab sealant segments 96S may have a width 96W within the range of from about 0.375 inches to about 0.675 inches. The tab sealant segments 96S may also be applied having any other desired width. In the illustrated embodiment, the tab sealant segments 96S have a thickness of about 0.035 inch. Alternatively, the tab sealant segments 96S may have a thickness within the range of from about 0.028 inches to about 0.050 inches. The tab sealant segments 96S may also be applied having any other desired thickness. It will be understood that the bead of tab sealant 96 may be applied as a continuous bead of sealant.

In the illustrated embodiment, wherein the reinforcement material 19 has a width W of about 1.0 inch, the reinforcement material 19 is positioned such that about 75 percent (0.75 inch) of the reinforced nail zone is positioned over the two-layer portion of the laminated shingle 74, and about 25 percent (0.25 inch) of the reinforced nail zone is positioned over the single-layer portion of the laminated shingle 74. Alternatively, within the range of from about 62.5 percent (0.625 inch) to about 87.5 percent (0.875) of the reinforced nail zone is positioned over the two-layer portion of the laminated shingle 74, and within the range of from about 12.5 percent (0.125 inch) to about 37.5 percent (0.375 inch) of the reinforced nail zone is positioned over the single-layer portion of the laminated shingle 74.

Figure 5:
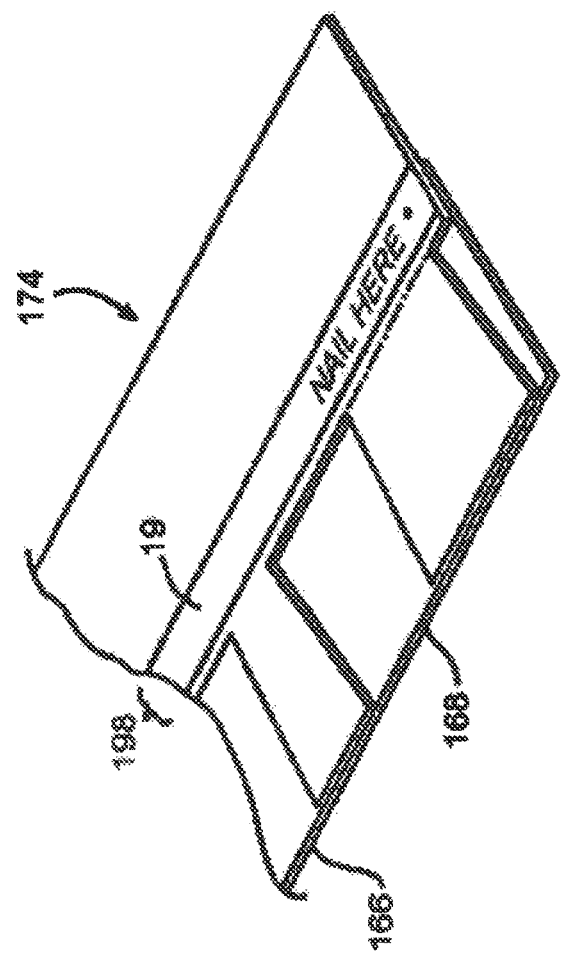
FIG. 5 is a perspective view of a portion of a second embodiment of a laminated shingle having reinforcement material.

Additionally, within the range of from about 50 percent (0.50 inch) to about 100 percent (1.0 inch) of the reinforced nail zone is positioned over the two-layer portion of the laminated shingle 74, and within the range of from about 0.0 percent (0.0 inch) to about 50 percent (0.50 inch) of the reinforced nail zone is positioned over the single-layer portion of the laminated shingle 74. For example, a second embodiment of the laminated shingle 174 is shown in FIG. 5 and includes the underlay sheet 166 and the overlay sheet 168. The reinforcement material 19 is attached to the overlay sheet 168 as described above and is positioned such that about 100 percent of the reinforced nail zone 198 is positioned over the two-layer portion of the laminated shingle 174, and about 0 percent of the reinforced nail zone 198 is positioned over the single-layer portion of the laminated shingle 174.

Figure 6:
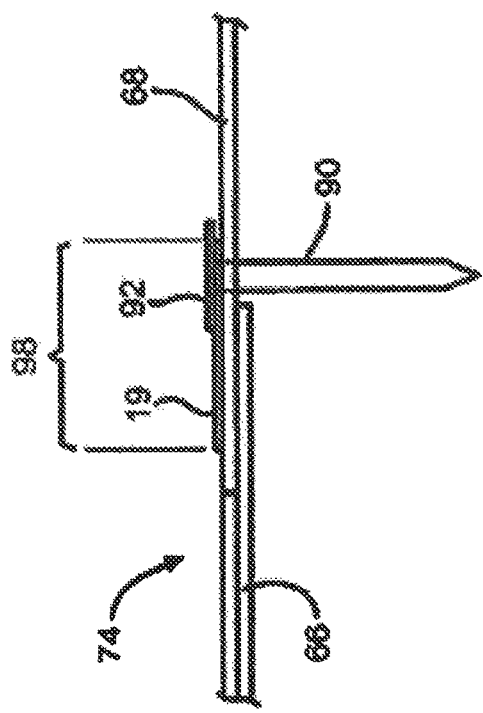
FIG. 6 is an enlarged schematic elevational view of a portion of the laminated shingle illustrated in FIGS. 2, 3, and 4.

An enlarged schematic view of a portion of the laminated shingle 74 is shown in FIG. 6. As shown, the reinforcement material 19 of the reinforced nail zone 98 is shown with a nail 90 installed through the reinforcement material 19 where it is adhered to the single-layer portion of the laminated shingle 74. The nail 90 extends only through the reinforcement material 19 and the overlay sheet 68, but a portion of the nail head 92 (left most portion of the nail head 92 when viewing FIG. 6) extends over the two-layer portion of the laminated shingle 74. Advantageously, the position of the reinforcement material 19 relative to the two-layer portion of the laminated shingle 74 significantly reduces the occurrence of shingle blow through and significantly increases nail pull through resistance during installation and wind uplift events such as occurs during high winds. Even if an installer drives a nail 90 through the upper most portion of the reinforcement material 19 (right most portion of reinforcement material 19 when viewing FIG. 6), as shown in FIG. 6, at least a portion of the nail head 92 will extend over and engage the two-layer portion of the laminated shingle 74, and thus be substantially prevented from blowing through the laminated shingle 74.

The embodiment of the reinforcement material 19 illustrated in FIGS. 2 and 3 is a woven material or web woven from polyester fabric yarns of about 150 denier. Alternatively, the reinforcement material 19 may be a material woven from fabric yarns within the range of from about 125 denier to about 175 denier. Additionally, the reinforcement material 19 may be a material woven from fabric yarns within the range of from about 100 denier to about 200 denier.

The embodiment of the woven reinforcement material 19 illustrated in FIGS. 2 and 3 is a 150 denier material having a density of about 80 yarns per inch in the warp or machine direction and about 45 yarns per inch in the cross-machine direction. Alternatively, the reinforcement material 19 may be a woven material having a density within the range of from about 65 yarns per inch to about 90 yarns per inch in the warp direction and within the range of from about 35 yarns per inch to about 55 yarns per inch in the cross-machine direction.

The embodiment of the woven reinforcement material 19 illustrated in FIGS. 2 and 3 may have a weight of about 2.8 ounces/yard.sup.2. Alternatively, the reinforcement material 19 may be a woven material having a weight within the range of from about 2.0 ounces/yard.sup.2 to about 3.5 ounces/yard. Additionally, the reinforcement material 19 may be a woven material having a weight within the range of from about 1.5 ounces/yard.sup.2 to about 4.5 ounces/yard.

The embodiment of the woven reinforcement material 19 illustrated in FIGS. 2 and 3 may also have a thickness of about 9.5 mils. Alternatively, the reinforcement material 19 may be a woven material having a thickness within the range of from about 5 mils to about 15 mils. Additionally, the reinforcement material 19 may be a woven material having a thickness within the range of from about 3 mils to about 20 mils. The reinforcement material 19 may also have having any other desired thickness.

The embodiment of the woven reinforcement material 19 illustrated in FIGS. 2 and 3 may further have an air permeability of about 210 cm.sup.3/s/cm.sup.2, measured, for example, in accordance with ASTM D737. Alternatively, the reinforcement material 19 may be a woven material having an air permeability within the range of from about 160 cm.sup.3/s/cm.sup.2 to about 260 cm.sup.3/s/cm.sup.2. Additionally, the reinforcement material 19 may be a woven material having an air permeability within the range of from about 85 cm.sup.3/S/cm.sup.2 to about 335 cm.sup.3/s/cm.sup.2.

The embodiment of the woven reinforcement material 19 illustrated in FIGS. 2 and 3 is formed from extruded polyester fibers that are woven. Alternatively, the woven reinforcement material 19 may be formed from any other suitable material, such as nylon, KEVLAR®, cotton, rayon, and fiberglass. It will be understood that the properties and characteristics, such as weight, density, and air permeability, of the polyester reinforcement material 19 described above will vary when the reinforcement material 19 is formed from materials other than polyester fiber. Further, polypropylene and/or other polymers may be used to form the woven reinforcement material 19 if either the reinforcement material 19 and/or the first asphalt-coated sheet 18 are cooled so that the reinforcement material 19 does not melt or shrink when it contacts the first asphalt-coated sheet. It will be understood that the embodiments of the woven reinforcement material described herein may have any desired weave pattern.

It will be understood that the reinforcement material 19 may be formed as a non-woven mat. In a first embodiment of a non-woven mat, the non-woven mat may comprise about 10 percent glass fiber and about 90 percent bi-component polymer fiber, or a glass to bi-component fiber ratio of 10:90. One example of a suitable bi-component fiber is a fiber having a polyethylene (PE) outer sheath and a polyethylene terephthalate (PET) core, wherein the bi-component fibers have a 50:50 by weight sheath to core ratio. It has been shown that the glass fiber in the reinforcement material 19 helps to ensure dimensional stability of the reinforcement material 19 when it is cured and when it is applied to a shingle while the asphalt of the shingle is still hot.

It will be understood that non-woven mats having glass to bi-component fiber ratios other than 10:90 may also meet or exceed the desired bond strengths over a range of temperatures. For example, non-woven mats having glass to bi-component fiber ratios within the range of from about 5:95 to about 25:75 may also be used.

It has been shown that a non-woven mat comprising about 10 percent glass fiber and about 90 percent bi-component fiber with a 50:50 PE sheath to PET core ratio does not require a binder, as the PE of the outer sheath melts when applied to hot asphalt during shingle production and bonds the glass, and polymer fibers together. The embodiments of the non-woven mats disclosed herein and comprising about 10 percent glass fiber and about 90 percent bi-component fiber were cured in an oven having a temperature of about 350 degrees F. It will be understood that if desired, a coupling agent or bond promoter may be applied to the fibers within the non-woven mat to enhance bond strength between the glass, and polymer fibers.

Advantageously, a non-woven mat having bi-component fiber as described above is sufficiently strong and will not de-laminate when installed on a roof. The non-woven mat having bi-component fiber also forms a very strong bond with both the filled-asphalt of the shingle and the tab sealant. Further, the filled-asphalt of the shingle will not bleed through the embodiment of the non-woven mat described above.

In the exemplary shingle 74 illustrated in FIG. 2, the shingle 74 may have a nail pull-through value, measured in accordance with a desired standard, such as prescribed by ASTM test standard D3462. For example, the shingle 74 may have a nail pull-through value that is greater than in an otherwise identical shingle without the reinforcement material 19.

Improved nail pull-through resistance values have been demonstrated using a modified version of the nail pull-through test prescribed by ASTM test standard D3462, wherein the test fixture has an opening that has been reduced from a 2.5 inch diameter to a 1.5 inch diameter. Using this modified test at a temperature of 72 degrees F., a shingle 74 having reinforcement material 19 formed from woven polyester fabric may have a nail pull-through resistance value within the range of from about 39 percent to about 46 percent greater than in an otherwise identical shingle without the reinforcement material 19.

When using the modified test at a temperature of 32 degrees F., a shingle 74 having reinforcement material 19 formed from woven polyester fabric may have a nail pull-through resistance value of at least about 25 percent greater than in an otherwise identical shingle without the reinforcement material 19. Alternatively, when using the modified test at a temperature of 32 degrees F., a shingle 74 having reinforcement material 19 formed from woven polyester fabric may have a nail pull-through resistance value within the range of from about 25 percent to about 37 percent greater than in an otherwise identical shingle without the reinforcement material 19.

Improved nail blow through values have been demonstrated in shingles 74 relative to otherwise identical shingles without the reinforcement material 19. To test nail blow through, a shingle 74 was placed on oriented strand board and a nail was driven into the shingle 74 using an air gun at 130 psi to simulate installation on the roof, and to replicate any nail blow through damage that may occur to the shingle 74 during installation with an air gun at 130 psi. The test was conducted at room temperature or at about 72 degrees F. After the nail was driven into the shingle 74, the shingle 74 was turned upside down, the nail was driven back out of the shingle 74, and any wood present was removed from the shingle 74 and nail hole. A second nail was inserted in the hole formed by the first nail and the shingle 74 was tested for nail pull through resistance using the modified test described above. Using this method, a shingle 74 having reinforcement material 19 formed from woven polyester fabric may have a nail pull-through resistance value within the range of from about 13 percent to about 42 percent greater than in an otherwise identical shingle without the reinforcement material 19.

Because there may be substantially no granules in the portion of the overlay sheet 68 covered by reinforcement material 19, the weight of the laminated shingle 74 may be reduced relative to an otherwise identical shingle without the reinforcement material 19. For example, weight of the exemplary laminated shingle 74 illustrated in FIG. 2, may be reduced within the range of from about four percent to about six percent relative to the weight of an otherwise identical shingle having no such reinforcement material 19. The material and transportation costs may also be reduced.

As described above and shown in FIG. 1, the continuous strip of reinforcement material 19 may be payed out from a roll 20 and adhered to the first asphalt coated sheet 18. As described above, the embodiment of the woven reinforcement material 19 illustrated in FIGS. 2 and 3 may have a thickness of about 9.5 mils. Alternatively, the reinforcement material 19 may be a woven material having a thickness within the range of from about 3 mils to about 20 mils, and may be too thick to be manufactured and mounted on a roll in the manner of known PET film.

At typical roofing shingle line speeds, it is necessary for the reinforcement material to be within the range of from about 20,000 feet to about 30,000 feet long to maintain splicing intervals of within the range of from about 15 minutes to about 30 minutes. Films of about 1.5 mils in thickness are typically produced on master rolls several feet wide and then slit to a desired width, such as within the range of from about 1.0 inch to about 1.5 inches. These slit rolls of film are considered dimensionally stable and easy to handle.

The embodiment of the woven reinforcement material 19 illustrated in FIGS. 2 and 3 may have a thickness of about 9.5 mils. The woven reinforcement material 19 has compressive and tensile moduli significantly lower than PET film. To ensure that splicing intervals at a desired level, such as within the range of from about 15 minutes to about 30 minutes, the outside diameter (OD) of a 1.0 inch wide roll of woven reinforcement material 19 would be significantly larger than a 1.0 inch wide roll of PET film due to the increased thickness of the woven reinforcement material 19.

Figure 7:
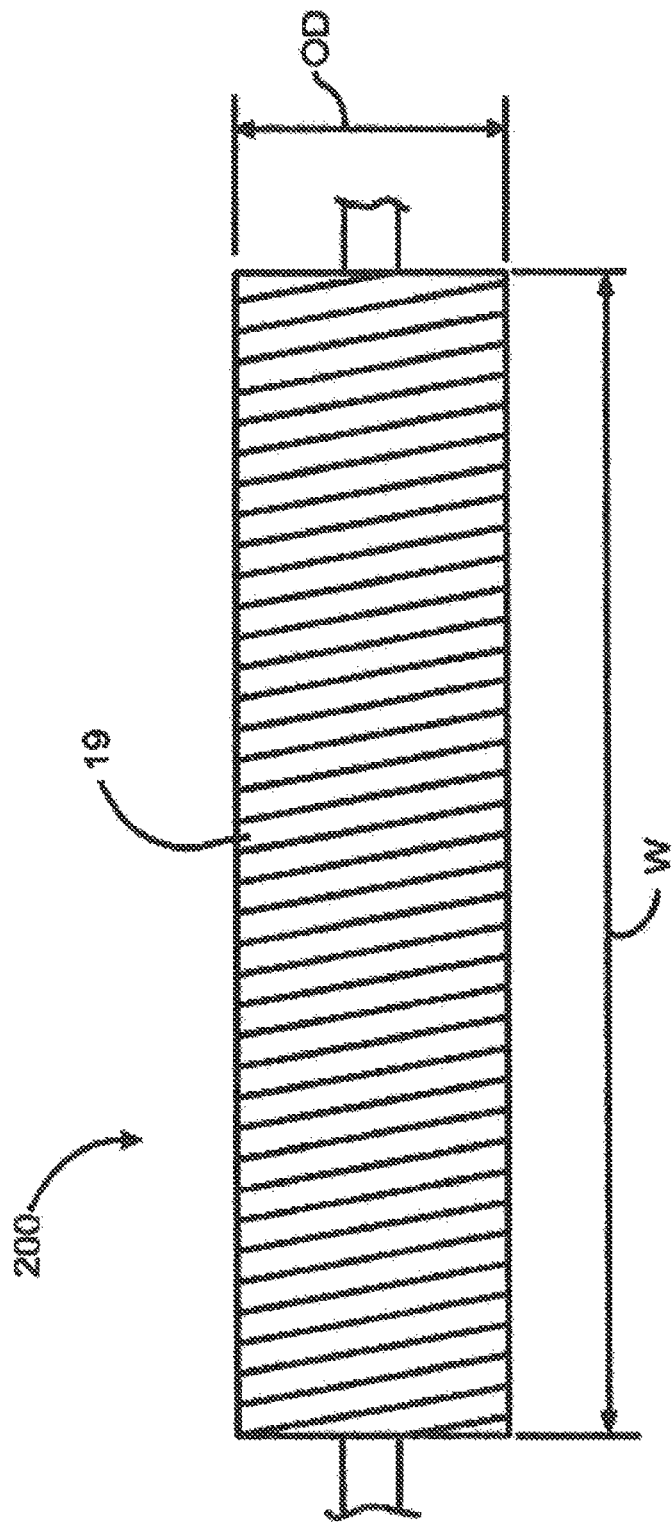
FIG. 7 is a schematic elevational view of a spool of reinforcement.

It has been shown that a length of woven reinforcement material 19 long enough to ensure that splicing intervals are within the range of from about 15 minutes to about 30 minutes may be provided on a spool or bobbin onto which the woven reinforcement material 19 has been applied or wound in a waywind pattern. In a first embodiment, as shown in FIG. 7, the spool 200 with the woven reinforcement material 19 installed may have a width W of about 10.0 inches. The woven reinforcement material 19 may be wound onto the spool 200 with about 20 wraps across the 10.0 inch width of the spool 19, such that the wound reinforcement material 19 has an outer diameter of about 19.0 inches. Once wound, the initial weight, i.e., the weight of the woven reinforcement material 19 before the spool 200 is used in a shingle manufacturing process, is about 35 lbs. In other embodiments, the spool 200 may hold within the range of from about 30 lbs. to about 40 lbs. of the woven reinforcement material 19. The spool may have any other desired width W, such as a width greater of at least about 10 inches. The spool may also hold any other desired amount of the woven reinforcement material 19, such as an amount greater than about 30 lbs. Additionally, the reinforcement material 19 may be wound onto the spool 200 such that the wound reinforcement material 19 has an outer diameter of at least about 19.0 inches.

Alternatively, the spool 200 with the woven reinforcement material 19 installed may have a width W of about 12.0 inches. The woven reinforcement material 19 may be wound onto the spool 200 with about 24 wraps across the 12.0 inch width of the spool 19, such that the wound reinforcement material 19 has an outer diameter of about 22.0 inches. The spool 200 will hold about 70 lbs of the woven reinforcement material 19. In other embodiments, the spool 200 may hold within the range of from about 65 lbs. to about 75 lbs. of the woven reinforcement material 19. Advantageously, with about 70 lbs. of the woven reinforcement material 19 on the spool 200, the spool 200 will run within the range of from about 45 minutes to about 60 minutes at a speed within the range of from about 600 ft/min to about 1000 ft/min before running out of woven reinforcement material 19 and needing to be changed. It will be understood that the length of time that the spool 200 will run before running out of woven reinforcement material 19 will vary with the thickness of the reinforcement material 19. It will be further understood that material, such as the woven reinforcement material 19, that has been applied to a spool in a waywind pattern may be unwound with little or no tangling.

It will be further understood that typical finishing operations performed on woven reinforcement material 19 during its manufacture adds undesirable cost to the woven reinforcement material 19. These finishing operations may consist of scouring the fabric to remove chemical processing agents. For polyester reinforcement material as described above, the polyester fabric may be heat-set when manufactured to reduce shrinkage when the polyester reinforcement material is applied to the hot asphalt of the first asphalt coated sheet 18. If desired, the reinforcement material 19 may be manufactured without these finishing operations. The reinforcement material 19 that has not been scoured or heat-set may then be slit to a width wider than the width desired on the finished laminated shingle 74 such that it shrinks to the desired width when applied to the hot asphalt of the first asphalt coated sheet 18.

For example, to achieve a second or installed width of about 1.0 inch on the finished laminated shingle 74, the reinforcement material 19 may be slit to a first or preinstalled width within the range of from about 1.125 inches to about 1.25 inches. It will be understood that the amount of shrinkage of the reinforcement material during application to the hot asphalt of an asphalt coated sheet will vary with the material of the reinforcement material 19, the temperature of the asphalt, and other factors.

If desired, processing chemicals such as lubricants may be applied to the reinforcement material 19 prior to its application to the hot asphalt of the first asphalt coated sheet 18. For example, a long chain saturated hydrocarbon lubricant with surface active functionality that is compatible with asphalt may aid in wetting out the fibers within the reinforcement material 19 by reducing the viscosity of the asphalt at the interface of the reinforcement material 19 and the asphalt during application of the reinforcement material 19. Examples of suitable lubricants include tallow amines, the reaction products of fatty acids with an excess of polyamines, and imidazalines derived from fatty acids.

Although the embodiments above have been disclosed in the context of a laminated shingle 74, it will be understood that the reinforcement material 19 may be attached to any other type of shingle, such as a single layer shingle.

As used herein the term "asphalt" is meant to include asphalts produced from petroleum refining, including residua from atmospheric distillation, from vacuum distillation, and from solvent de-asphalting units, recycled asphalt streams, such as re-refined motor oil bottoms. Mixtures of different asphalts can also be used. The exemplary embodiments disclosed herein can also be used with natural bitumen, such as the products extracted from the oil sands in Alberta or asphalts derived from oil sands by various refinery processes.

As used herein the term "asphalt" is meant to include asphalts produced from petroleum refining, including residua from atmospheric distillation, from vacuum distillation, and from solvent de-asphalting units, recycled asphalt streams, such as re-refined motor oil bottoms. Mixtures of different asphalts can also be used. The exemplary embodiments disclosed herein can also be used with natural bitumen, such as the products extracted from the oil sands in Alberta or asphalts derived from oil sands by various refinery processes.

By "roofing shingle coating asphalt" or "coating asphalt," as used herein, is meant an asphalt that is suitable for use as a coating asphalt to make asphalt roofing shingles as defined by ASTM D 3462-16: a softening point minimum of from 190° F. (88° C.) to 320° F. (160° C.) and a penetration at 77° F. (25° C.) minimum of 15 decimillitres (dmm). This softening point is referred to herein as the "target softening point". Asphalts falling under the ASTM D 3462-16 definition of coating asphalt are unfilled asphalts, prior to any inclusion of filler materials.

In other exemplary embodiments, the term "coating asphalt" meets one or more of the tighter specifications that may be used by shingle manufacturers. Some examples of these specifications include a softening point of from 200° F. (93° C.) to 215° F. (102° C.), a penetration at 77° F. (25° C.) of from 16 dmm to 22 dmm, a melt viscosity at 400° F. (204° C.) of from 150 centipoise (cps) to 450 cps, a durability of greater than 60 cycles in the Weatherometer, and a flashpoint of greater than 550° F. (288° C.). Other examples of suitable coating asphalts include those with a softening point of from 212° F. (100° C.) to 220° F. (104° C.), a penetration at 77° F. (25° C.) of from 16 dmm to 20 dmm, a melt viscosity at 400° F. (204° C.) of from 275 cps to 375 cps, and a flashpoint of greater than 550° F. (288° C.). In some manufacturers' specifications, a minimum specific target penetration of 15 dmm or 17 dmm is used, although there are a range of different manufacturer specifications.

In a first aspect of the invention, a polymer-modified asphalt composition is provided, which comprises an asphalt material that is modified with one or more polymers. In some exemplary embodiments, the coating composition further comprises a secondary additive that is a wax, fatty acid amide, or other viscosity reducing material. The polymer-modified asphalt composition has unexpectedly been found to demonstrate a unique balance between providing improved weathering properties, while also providing acceptable or enhanced granule adhesion.

The asphalt material may include various types or grades of asphalt, including flux, paving grade asphalt blends, propane washed asphalt, and/or blends thereof. Effective blends of asphalt or bituminous materials are understood by those of ordinary skill in the art. In some exemplary embodiments, the asphalt includes one or more fillers, such as a filler of finely ground inorganic particulate matter, such as ground limestone, dolomite or silica, talc, sand, cellulosic materials, fiberglass, calcium carbonate, or combinations thereof. In some exemplary embodiments, the one or more fillers is included in at least 10 wt. %, based on the total weight of the polymer-modified asphalt composition. In some exemplary embodiments, the one or more fillers are included in about 20 wt. % to about 80 wt. %, including about 25 wt. % to about 75 wt. %, about 30 wt. % to about 70 wt. % and about 40 to about 65 wt. %, based on the total weight of the polymer-modified asphalt composition. In some exemplary embodiments, the asphalt composition further comprises various oils, fire retardant materials, and other compounds conventionally added to asphalt compositions for roofing applications.

In some exemplary embodiments, the asphalt material has the advantage of being prepared using a wide array of paving grade asphalt materials, such as different types of paving asphalts used independently or as a mixture with various types of asphalt, such as, for example, solvent extracted asphalt, naturally occurring asphalt, synthetic asphalt, and recycled asphalt. Typical paving grade asphalts are straight run asphalts derived from the atmospheric and vacuum distillation of crude oils, or are made by blending vacuum tower residua with residua from solvent de-asphalting units or re-refined motor oil bottoms or other recycled streams.

By "paving grade asphalt," as used herein, is meant a performance grade asphalt according to AASH20 17320-17 that has a softening point within the range of about 60° F. to about 130° F. and a penetration value of at least about 25 dmm. Paving grade asphalts are not typically used in roofing applications because such asphalts are not able to achieve the properties required to be considered "coating grade" asphalt, as defined by ASTM D 3462-16: a softening point minimum of from 190° F. (88° C.) to 235° F. (113° C.) and a penetration at 77° F. (25° C.) minimum of 15 decimillimeter (dmm).

In some exemplary embodiments, the asphalt material used in the asphalt composition includes at least a paving-grade asphalt. Any suitable paving-grade asphalt(s) can be used, for example paving asphalts which meet the PG 64-22 specifications (AASHTO M320). PG 64-22 is the most common paving specification in the United States. Paving asphalts were previously graded by viscosity and a common asphalt that is similar to the PG 64-22 grade asphalt and also usable in this method, is the old AC20 grade asphalt (ASTM D 3381). Other examples of suitable paving-grade asphalts include PG 67-22, PG 70-22, PG 58-22, PG 58-28, PG 58-22, PG 70-16, PG 70-10, PG 67-10, pen grade 40/50, pen grade 60/70, pen grade 85/100, pen grade 120/150, AR4000, AR8000, and AC/30 grade.

In some exemplary embodiments, the paving grade asphalt is included in an amount from about 15 to about 80 wt. %, including about 17 wt. % to about 50 wt. %, including about 20 wt. % to about 45 wt. %, about 22 wt. % to about 40 wt. % and about 24 to about 35 wt. %, based on the total weight of the polymer-modified asphalt composition.

In some exemplary embodiments, one or more additives are added to the paving-grade asphalt, including one or more polymer additive and, optionally, a secondary additive. The polymer additive(s) may include any suitable polymer, or any suitable mixtures of different polymers. In some exemplary embodiments, the polymer additive comprises an elastomeric radial or linear polymer. In some exemplary embodiments, the polymer additive comprises a copolymer such as a linear or radial copolymer. In some embodiments the polymer additive comprises one or more of atactic polypropylene (APP), isotactic polypropylene (IPP), styrene-butadiene block copolymer (SBS), chloroprene rubber (CR), amorphous polyolefin, SBR latex, natural and reclaimed rubbers, butadiene rubber (BR), acrylonitrile-butadiene rubber (NBR), isoprene rubber (IR), styrene-polyisoprene (SI), butyl rubber, ethylene propylene rubber (EPR), ethylene propylene diene monomer rubber (EPDM), polyisobutylene (PIB), chlorinated polyethylene (CPE), styrene ethylene-butylene-styrene (SEBS), hydrogenated SBS, and vinylacetate/polyethylene (EVA). In other exemplary embodiments, the polymer additive comprises a radial polymer or a combination of linear and radial polymers. Examples of polymer modifiers are also disclosed in U.S.

Pat. No. 4,738,884 to Algrim et al. and U.S. Pat. No. 3,770,559, to Jackson, the contents of which are incorporated herein by reference in their entirety. In some exemplary embodiments, the asphalt is modified with styrene-butadiene block copolymer (radial SB S).

In some exemplary embodiments, the polymer additive is included in the polymer modified coating asphalt composition in an amount from about 0.5 wt. % to about 20.0 wt. %, based on the total weight of the polymer modified coating asphalt composition. In some exemplary embodiments, the polymer additive is included in an amount from about 1.0 to about 15.0 wt. %, or from about 1.5 to about 10.0 wt. %, or from about 2.0 to about 7.0 wt. %, or from about 2.5 to about 6.8 wt. %, or from about or from about 3.0 to about 6.5 wt. %, or from about 3.5 to about 6.2 wt. %, or from about 5.5 to about 6.15 wt. %, based on the total weight of the polymer modified coating asphalt composition. In some exemplary embodiments, the polymer additive is included in the polymer modified coating composition in an amount of about 6.0 wt. %, based on the total weight of the polymer modified coating asphalt composition.

Non-coating grade asphalts, such as paving-grade asphalt, have softening points, penetration values, and melt-viscosities that are not optimal for coating compositions. As such, non-coating grade asphalt will often be air-blown to raise the softening point, lower the penetration value, and raise the melt viscosity, so that the asphalt can be used for coating roofing products. This air-blowing process increases the softening point of the asphalt. Other times the paving grade asphalt will be partially-blown or "under-blown" to help reduce loss of material, known as "blow loss" associated with the oxidation process. Such "under-blown" asphalt materials then require the addition of a blowing catalyst, such as phosphoric acid, ferric chloride, phosphorus pentoxide, aluminum chloride, hydrohalic acid, and boric acid and a wax to obtain the desired coating grade asphalt properties, such as that described in U.S. Pat. No. 7,951,239, the disclosure of which is incorporated by reference herein in its entirety.

The use of oxidized asphalt with polymer additives, however, has a number of drawbacks. First, oxidized asphalt does not react well with some polymers, such as SBS, and is thus often not suitable in polymer-modified asphalt compositions. Thus, in some exemplary embodiments, the asphalt in the present invention is not oxidized or blown. In other exemplary embodiments, the asphalt is no greater than 50% oxidized, such as no greater than 30% oxidized, no greater than 20% oxidized, no greater than 10% oxidized, no greater than 5% oxidized, and no greater than 1% oxidized.

In some exemplary embodiments, the secondary additive is a viscosity reducing agent, such as one or more of a wax, a fatty acid ester, a fatty acid ester salt, and/or a fatty acid amide. In some exemplary embodiments, the paving-grade asphalt material is heated and mixed so that the polymer and homogenously blend together. The polymer and the secondary additive do not react or crosslink, and simply form a polymer/secondary additive blend. In some exemplary embodiments, after blending the polymer modifier and secondary additive into the asphalt, the asphalt composition achieves penetration and softening point values that meet the target ranges for these values in a coating-grade asphalt.

Any type of wax, or a mixture of different waxes, capable of functioning as described herein can be used in the method. In one exemplary embodiment, the wax has a high congealing point or a high drop melt point of at least about 75° C., specifically at least about 90° C., and more specifically at least about 100° C. When referring to wax testing, the term "melt point" refers broadly to either congealing point or drop melt point, which are defined by ASTM D 938 in the case of congealing point and ASTM D 3954 in the case of drop melt point. Also, wax can be characterized by penetration or hardness (ASTM D5 or ASTM D 1321), density (ASTM D1505), viscosity (ASTM D 4402 or ASTM D88), or acid value (ASTM D 1386).

In some exemplary embodiments, the wax is one or more of a paraffin wax and a non-paraffin wax. Paraffin waxes typically have melting points below 70° C. and have less than 45 carbon atoms. Non-paraffin waxes typically have melting points above 70° C. and have more than 45 carbon atoms. The non-paraffin wax can be one or more of a natural wax, a modified natural wax, a partial synthetic wax, and a full synthetic wax. Non-limiting examples of suitable partial and fully synthetic waxes include ethylene bis-stearamide wax (EBS), Fischer-Tropsch wax (ET), oxidized Fischer-Tropsch wax (FTO), stearic acid pitch, polyolefin waxes such as polyethylene wax (PE), oxidized polyethylene wax (PEO), polypropylene wax, polypropylene/polyethylene wax, alcohol wax, silicone wax, petroleum waxes such as microcrystalline wax, and chlorinated wax. Any suitable mixtures of different waxes can also be used. For example, the wax can include a blend of a Fischer-Tropsch wax and a polyethylene wax. In some exemplary embodiments, the wax is a non-paraffinic wax with a high melting point (greater than 70° C.). In various exemplary embodiments, the wax has a melting point of at least 100° C., such as at least 120° C., or at least 130° C., or at least 140° C.

In some exemplary embodiments, the wax is a naturally occurring wax can be derived from a plant, animal or mineral. Some examples of natural waxes that may be suitable include plant waxes such as candelilla wax, carnauba wax, rice wax, Japan wax and jojoba oil; animal waxes such as beeswax, lanolin and whale wax; and mineral waxes such as montan wax, ozokerite and ceresin.

In some exemplary embodiments, the secondary additive comprises at least ethylene bistearamide (EBS), which has a melt point of 140 to 146° C., a penetration hardness at 25° C. of about 1 dmm, a density of from about (8.49 lbs/gal), and an acid number of 4. EBS is a brittle wax-like solid formed from the reaction of an amine with hydroxystearic acid. The formed hydroxystearamide is a high melting point wax-like material that is extremely resistant to acids and alkalis in contrast to natural and synthetic ester waxes.

In some exemplary embodiments, the secondary additive comprises a salt of a fatty acid ester, such as a fatty acid ester derived from a plant or animal.

Alternatively, or in addition, the secondary additive is a Fischer-Tropsch wax with a melt point of greater than 100° C. and a hardness at 25° C. from 1 dmm to a value so soft that it could not be measured by the techniques in ASTM D5. In another exemplary embodiment, the secondary additive is a polyethylene wax with a melt point of from 100 to 125° C., a hardness at 25° C. of from 1 to 7 dmm, a density of from 0.91 to 0.95 gm/cc, a viscosity of from 20 to 450 cps at 140° C., and a nil acid number. In another exemplary embodiment, the wax is an oxidized polyethylene wax with melt point of from 135 to 140° C., a hardness at 25 C of <0.5 dmm, a viscosity of from 3600 to 4500 cps at 150° C., and acid number of 30.

In some exemplary embodiments, the secondary additive is one or more fatty acid amides. Fatty acid amides are amides produced from the reaction of a fatty acid and an amine. The fatty acid amide can be a monoamide, a substituted amide, a bisamide, a methylol amide, an ester amide, an alkyl urea, and the like. Non-limiting examples of suitable fatty acid amides include oleamide, stearamide, erucamide, behenamide, N-oleylpalmitamide, N-stearylerucamide, ethylene bis-stearamide (EBS), and ethylene bis-oleamide.

In some exemplary embodiments, the secondary additive is included in the polymer modified coating asphalt composition in an amount from about 0.01 wt. % to about 20.0 wt. %, based on the total weight of the polymer modified coating asphalt composition. In some exemplary embodiments, the secondary additive is included in an amount from about 0.5 to about 15.0 wt. %, or from about 1.0 to about 10.0 wt. %, or from about 1.2 to about 7.0 wt. %, or from about 1.5 to about 5.0 wt. %, or from about 1.6 to about 3.0 wt. %, or from about 1.7 to about 2.5 wt. %, or from about 1.75 to about 2.4 wt. %, or from about 1.8 to about 2.3 wt. %, or from about 1.85 to about 2.2 wt. %, or from about 1.90 to about 2.15 wt. %, or from about 1.95 to about 2.10 wt. %, or from about 1.98 to about 2.05 wt. %, based on the total weight of the polymer modified coating asphalt composition. In some exemplary embodiments, the secondary additive is included in the polymer modified coating asphalt composition in an amount of about 2.0, based on the total weight of the polymer modified coating asphalt composition.

In some exemplary embodiments, the resulting polymer modified coating asphalt may comprise about 60 to about 99 wt. % of a paving grade asphalt, about 1 to about 10 weight percent of a polymer additive, and 0.5 to about 8.0 weight percent of the secondary additive, based on the total weight of the polymer modified coating asphalt. In some exemplary embodiments, the polymer modified coating asphalt comprises about 80 to about 95 wt. % of a paving grade asphalt, about 2 to about 7 weight percent polymer additive, and about 2.0 to about 5.0 weight percent secondary additive, based on the total weight of the polymer modified coating asphalt. In some exemplary embodiments, the polymer modified coating asphalt comprises about 80 to about 95 wt. % of a paving grade asphalt, about 1 to about 8 weight percent polymer additive, and about 1.85 to about 2.4 weight percent secondary additive, based on the total weight of the polymer modified coating asphalt. In some exemplary embodiments, the polymer modified coating asphalt comprises about 80 to about 95 wt. % of a paving grade asphalt, about 1 to about 8 weight percent polymer additive, and about 1.9 to about 2.4 weight percent secondary additive, based on the total weight of the polymer modified coating asphalt. A filler may then be added to the polymer modified asphalt composition, such that the filled asphalt composition comprises about 30 to 80 wt. % of filler material and about 20 to 70 wt. % of the polymer modified asphalt composition. In some exemplary embodiments, the filled asphalt composition comprises about 45 to 70 wt. % of filler material and about 30 to 55 wt. % of the polymer modified asphalt composition.

Table 1, below, outlines exemplary polymer modified asphalt compositions, in accordance with the present inventive concepts.

TABLE 1

| Ingredient | Exemplary Comp. 1 | Exemplary Comp. 2 | Exemplary Comp. 3 |
|---|---|---|---|
| Paving Grade Asphalt | 15 to 80 wt. % | 20-40 wt. % | 24-30 wt. % |
| Filler | 20-80 wt. % | 45-70 wt. % | 62-68 wt. % |

TABLE 1-continued

| Ingredient | Exemplary Comp. 1 | Exemplary Comp. 2 | Exemplary Comp. 3 |
|---|---|---|---|
| Polymer additive | 2.0-7.0 wt. % | 3.5-6.5 wt. % | 6.0 wt. % |
| Secondary additive | 1.8-2.5 wt. % | 1.85-2.45 wt. % | 2.0 wt. % |

Although SBS-type polymers are often used to modify asphalt to make coatings for various roofing products, the butadiene portion of the polymer is susceptible to chain-scission when exposed to UV-light from the sun. Accordingly, in such instances, the coating must be protected with an opaque mineral surfacing or some other form of additional coating layer to protect the polymer modified asphalt. However, it has been discovered that the secondary additive creates a protective layer over a shingle when included in an asphalt-based coating composition. This protective layer is created by the secondary additive "blooming" to the surface of the coating, preserving the asphalt coating below. This protective coating protects the butadiene portion of the polymer from UV-light, which reduces or eliminates the need protect the asphalt coating with any additional surfacing layers.

Other materials suitable for use in the asphalt composition include tackifying resins and other types of natural and synthetic rubber materials and thermoplastic polymers. Additionally, recycled roof tear-off materials, such as shingles, may be included in the asphalt composition. Recycled shingles may be processed in a wide variety of different ways to allow the material to be used in the composition.

In some exemplary embodiments, addition of the polymer additive and secondary additive alters the physical properties the paving grade asphalt to transform it into a suitable coating grade asphalt that can be using in roofing applications. In some exemplary embodiments, addition of the polymer additive and secondary additive results in an asphalt composition that has a final softening point of about 185° F. to about 250° F. This range is referred to herein as the "target softening point range." In some exemplary embodiments, addition of the polymer and additive results in an asphalt composition that has a softening point of from 190° F. to about 240° F., or from 200° F. to about 230° F.

In some exemplary embodiments, the secondary additive helps the non-coating grade asphalt to reach the target pen range, which is between about 15 to 50 dmm, including about 17 to 40 dmm, and about 20 to 35 dmm.

In some exemplary aspects of the subject invention, the polymer modified asphalt composition is used to manufacture an impact resistant shingle. The impact resistant shingle comprises one or more substrates and an asphalt coating composition that is applied to one or both sides of the one or more substrates. In some exemplary embodiments, the coating composition contains asphalt that is modified with one or more polymer additives. In some exemplary embodiments, the asphalt composition further comprises a secondary additive that may be a wax, fatty acid amide, or other viscosity reducing agent. In some exemplary embodiments, the coating composition provides impact resistance to the shingle.

The substrate used in the impact resistant shingle is not particularly limited and can be any material typically used in the roofing industry. In some exemplary embodiments, the substrate may be a fibrous reinforcement layer, such as chopped strand mats, continuous strand mats, swirl mats, woven and non-woven fabrics, e.g., woven rovings, insect screening, scrim and the like. In some exemplary embodiments, the fibrous materials are glass but they may also be organic polymeric materials or combinations of glass and organic polymers.

In some exemplary embodiments, this reinforcing base material serves as a matrix to support an asphalt coating and gives the shingle strength.

The secondary additives described in the exemplary embodiments herein have a number of important functions. In some exemplary embodiments, the secondary additive imparts increased impact resistance to the shingle, without the addition of separate or additional substrate layers. In some exemplary embodiments, the secondary additive increases the adhesion of granules on top of the shingle. In other exemplary embodiments, the secondary additive increases the tensile and tear strengths of the shingle itself. For instance, shingles coated with the polymer modified asphalt coating composition disclosed herein demonstrated an increase of at least 5%, or at least 8%, or at least 10%, compared to a shingle coated with an otherwise identical polymer modified asphalt composition excluding the secondary additive. In some exemplary embodiments, the additive also helps to increase the creep value of the asphalt coating.

Additionally, the polymer modified asphalt composition according to the present inventive concepts demonstrates improved stability, as shown by ASTM D7173-11 "Standard Practice for Determining the Separation Tendency of Polymer from Polymer Modified Asphalt". Coatings using a polymer modifier separate to a greater or lesser extent depending on the compatibility of a given polymer with the a given asphalt. The presence of the secondary additive has been found to stabilize the asphalt blend.

Additionally, the coatings with wax/polymer presented no stain when tested by ASTM D2746-07(2013) "Standard Test Method for Staining Tendency of Asphalt (Stain Index)". Per the standard, "this test method measures the tendency for oil components to separate spontaneously from asphalt. The separation of oil components can cause staining in asphalt roofing products and adjacent materials in storage and use. The stain index is related to the thermal stability of the asphalt. Higher stain index values indicate lower stability and greater tendency for staining." The polymer modified asphalt coating composition has zero stain due to the fact that the secondary additive makes the polymer and asphalt compatible.

Conventional products that are designed to provide impact resistance use an integrated polymeric backing, typically on the underside of the shingle. Such a product is illustrated in U.S. patent application Ser. No. 09/223,578, which is incorporated herein by reference. While this polymeric backing imparts the necessary impact resistance, such a backing is expensive, adds complexity to the manufacturing process, and results in various process limitations. Additionally, a significant amount of waste and side-products are produced during application and manufacture of the polymeric backing and the roofing material made with the polymeric backing. The products according to the exemplary embodiments disclosed herein, however, do not require this polymeric backing, thereby reducing overall cost and simplifying the manufacturing process. Accordingly, in some exemplary embodiments, roofing materials manufactured in accordance with the subject invention are free of any polymeric backing material.

The improved impact resistance of the roofing materials of the present invention is demonstrated by a standard method, UL 2218, "Standard for Impact Resistance of Prepared Roof Covering Materials", Underwriters Laboratories, May 31, 1996. In this method, the roofing material is secured to a test deck and a steel ball is dropped vertically through a tube onto the upper surface of the roofing material. The roofing material can be tested at four different impact force levels: Class 1 (the lowest impact force) through Class 4 (the highest impact force). The force of impact in the different classes is varied by changing the diameter and weight of the steel ball, and the distance the ball is dropped. For example, the Class 1 test uses a steel ball having a diameter of 1.25 inches (32 mm) weighing 0.28 pounds (127 g) that is dropped a distance of 12 feet (3.7 m), while the Class 4 test uses a steel ball having a diameter of 2 inches (51 mm) weighing 1.15 pounds (521 g) that is dropped a distance of 20 feet (6.1 meters). After the impact, the roofing material is inverted and bent over a mandrel in both the machine and cross directions, and the lower surface of the roofing material is examined visually for any evidence of an opening or tear. A 5× magnification device may be used to facilitate the examination of the roofing material. If no evidence of an opening is found, the roofing material passes the impact resistance test at the UL 2218 class tested. A roofing material having a secondary additive according to the present inventive concepts demonstrated an increased impact resistance of at least two UL 2218 classes compared with the same roofing material without the secondary additive. In some exemplary embodiments, the roofing material made in accordance with the present exemplary embodiments meets at least the UL2218 Class 3 impact resistance standard, and in some exemplary embodiments, meets the UL 2218 Class 4 impact resistance standard.

It has been discovered that the inclusion of the secondary additive provides the additional benefit of significantly improved weathering properties, compared to otherwise identical asphalt compositions excluding the secondary additive, or including an additive in an amount less than 1.8 wt. %.

The inventors have further discovered a particular concentration of secondary additive that provides the above-described improved weathering properties, while maintaining, or improving granule adhesion. Particularly, the addition of the secondary additive in an amount from about 1.85 wt. % to less than about 2.5 wt. % provides improved weatherability, with no negative impact on granule adhesion as compared to an otherwise identical shingle made with a conventional oxidized asphalt coating. In contrast, secondary additive amounts over about 3.0 wt. % can cause the granule adhesion to drop.

Furthermore, the secondary additive has been unexpectedly found to substantially lower the viscosity of the asphalt composition, compared to a conventional oxidized asphalt coating composition.

Figure 8:
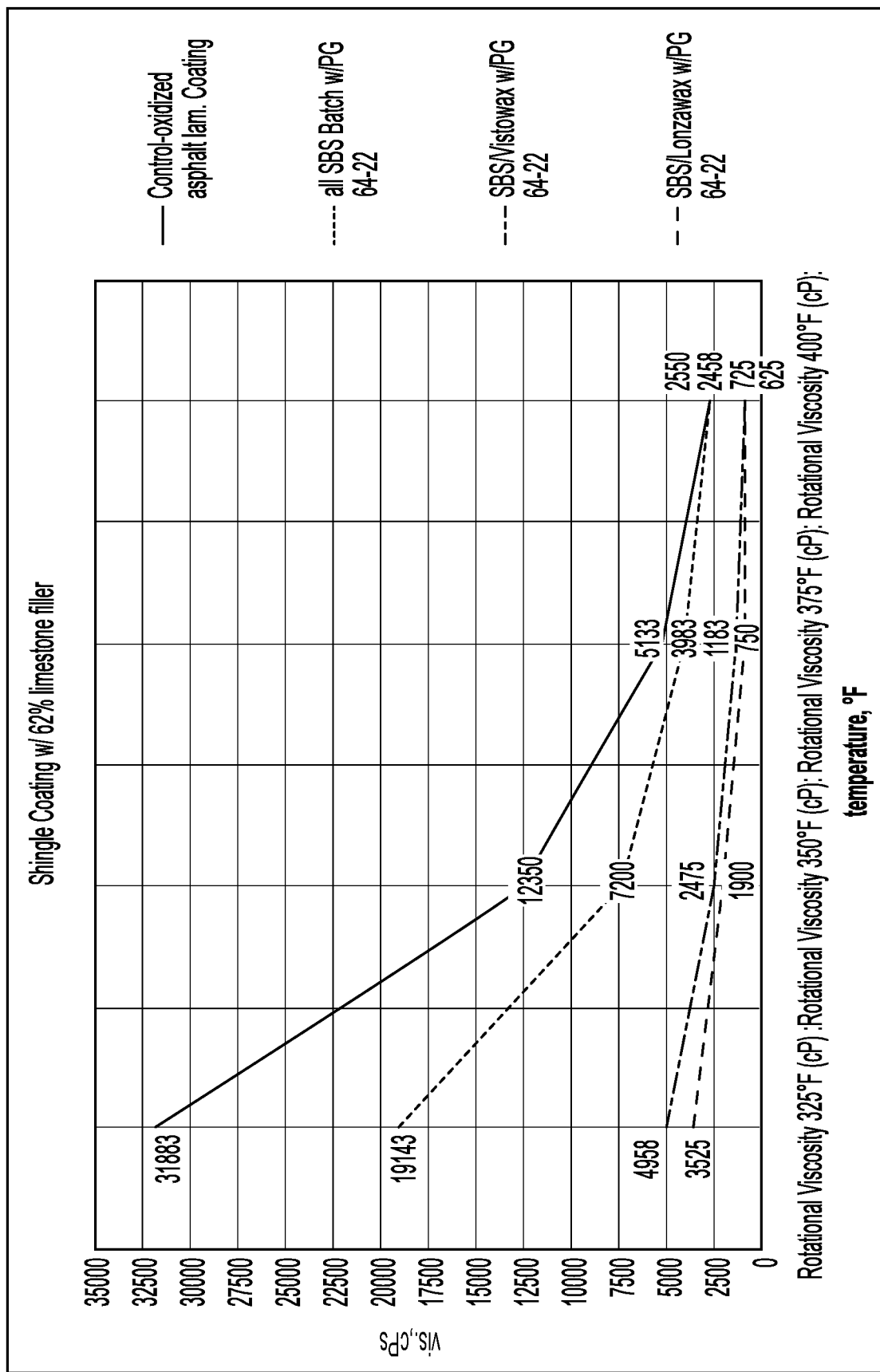
FIG. 8 graphically illustrates the reduction in viscosity of the polymer modified asphalt coating compositions, compared to conventional asphalt compositions.

As illustrated below in Table 2, a conventional oxidized asphalt coating composition has a rotational viscosity at 325 F of 31,883 cP and an SBS-modified paving-grade asphalt has a rotational viscosity at 325 F of 19,143 cP. In contrast, the addition of a wax, such as vistowax or lonza wax, demonstrated a reduction in viscosity by over three times that of an otherwise similar asphalt composition without the wax additive. Each of the asphalt compositions below in Table 2 include 62% limestone filler. This reduction in viscosity is further illustrated in FIG. 8.

TABLE 2

| Type | Control-oxidized Asphalt Coating. | all SBS Batch w/PG 64-22 (paving grade) | SBS 2.0 wt. % Polyethylene wax w/PG 64-22 (paving grade asphalt) | SBS/2.0 wt. % EBS wax w/PG 64-22 (paving grade asphalt) |
|---|---|---|---|---|
| Rotational Viscosity 325° F. (cP): | 31883 | 19143 | 4958 | 3525 |
| Rotational Viscosity 350° F. (cP): | 12350 | 7200 | 2475 | 1900 |
| Rotational Viscosity 375° F. (cP): | 5133 | 3983 | 1183 | 750 |
| Rotational Viscosity 400° F. (cP): | 2550 | 2458 | 725 | 625 |

In some exemplary embodiments, the polymer modified coating asphalt is prepared by the following method. The necessary amount of asphalt and polymer additive are mixed together under a high shear mixer (an example of which includes a Silverson Lab mixer) over heat (about 380° F.). Once the polymer added has fully mixed with the asphalt, the secondary additive is slowly added under a low shear mixer (less than 600 rpm) and the mixture is mixed under the low shear for about 2-4 hours at 380° F. The filler is then added and mixed for an additional 10-30 minutes under the low shear. The mixture is then allowed to cool to 310° F. or less.

All combinations of method or process steps as used herein can be performed in any order, unless otherwise specified or clearly implied to the contrary by the context in which the referenced combination is made.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions.

EXAMPLES

The following examples are included for purposes of illustration and are not intended to limit the scope of the methods described herein.

Example 1

Physical testing was conducted on the inventive polymer-modified asphalt compositions to measure physical properties of the asphalt. An asphalt composition according to Tables 3 and 4 was prepared and physical properties were measured before addition of the secondary additive, while the asphalt composition was blended with the secondary additive, and after addition of a limestone filler. The results are listed in the tables that follow. PG 64-22 Whiting is a paving grade asphalt binder commercially available from BP. Calprene 411 is a 70/30 butadiene/styrene thermoplastic copolymer (radial polymer) that has been polymerized in solution and is commercially available from Dynasol. Lonza EBS wax is a low-density polyethylene wax (N,N' Ethylene Bisstearamide) commercially available from Lonza.

TABLE 3

| Ingredient | Concentration (based on total weight of the polymer modified asphalt) |
|---|---|
| PG 64-22 Whiting Asphalt Binder | 92 wt. % |
| Calprene 411 | 5.0 wt. % |
| Lonza wax | 3.0 wt. % |

TABLE 4

| Ingredient | Concentration (based on total weight of the asphalt composition) |
|---|---|
| Polymer modified asphalt | 38 wt. % |
| Limestone filler | 62 wt. % |

Table 5 illustrates the results for physical tests run on paving grade asphalt composition with no wax additive or radial polymer.

TABLE 5

| Softening Point | 119° F. |
|---|---|
| Pen at 77° F. | 62.0 dmm |

Table 6 shows the results for physical tests run on the asphalt composition while it was blended with the wax additive and radial polymer. The asphalt composition was blended together for five hours at 380° F.

TABLE 6

| Softening Point | 214° F. |
|---|---|
| Pen at 77° F. | 46.0 dmm |

The results in Table 6 show that as the radial polymer and wax additive are being added to the asphalt composition that the physical properties are beginning to improve. Particularly, the softening point increased and the pen dropped significantly.

Table 7 illustrates the results for the physical tests run on the asphalt composition after five hours when the composition had been fully blended and heated. Additionally, the limestone filler was added and fully integrated into the composition.

TABLE 7

| Softening Point | 241° F. |
|---|---|
| Pen at 77° F. | 16.0 dmm |

The results in Table 7 show that after the wax additive and radial polymer have had sufficient time to blend with the asphalt and filler material, the softening point significantly increased and the pen significantly decreased, as compared to both the base asphalt physical properties and the physical properties of the asphalt composition before the addition of the filler material. The softening point of 241° F. and pen of 16.0 dmm are both within the target ranges for a suitable coating grade asphalt.

Example 2

An asphalt composition according to Tables 8 and 9 was prepared and physical properties were measured before addition of a wax additive, while the asphalt composition was blended with the additive, and after the addition of a limestone filler. The results are listed in the tables that follow. Sasobit wax is a synthetically produced Fischer-Tropsch (FT) wax commercially available from Sasol.

TABLE 8

| Ingredient | Concentration (based on total weight of the polymer modified asphalt composition) |
| --- | --- |
| PG 64-22 Whiting Asphalt Binder | 92 wt. % |
| Calprene 411 | 5.0 wt. % |
| Sasobit wax | 3.0 wt. % |

TABLE 9

| Ingredient | Concentration (based on total weight of the asphalt composition) |
| --- | --- |
| Polymer modified asphalt | 38 wt. % |
| Limestone filler | 62 wt. % |

Table 10 shows the results for physical tests run on the base paving grade asphalt composition with no wax additive or radial polymer.

TABLE 10

| | |
| --- | --- |
| Softening Point | 119° F. |
| Pen at 77° F. | 62.0 dmm |

Table 11 shows the results for physical tests run on the asphalt composition while it was blended with the wax additive and radial polymer. The asphalt composition was blended together for five hours at 380° F.

TABLE 11

| | |
| --- | --- |
| Softening Point | 208° F. |
| Pen at 77° F. | 18.0 dmm |

Table 12 shows the results for the physical tests run on the asphalt composition after five hours when the composition had been fully blended with the limestone filler.

TABLE 12

| | |
| --- | --- |
| Softening Point | 216° F. |
| Pen at 77° F. | 14.0 dmm |

The results in Table 12 show that after the wax additive and radial polymer have had sufficient time to blend with the asphalt and filler material, the softening point is significantly increased and the pen is significantly decreased as compared to both the base asphalt physical properties and the physical properties of the asphalt composition before the addition of the filler material. The softening point of 216° F. and pen of 14.0 dmm are both within the target ranges for a suitable coating grade asphalt.

Example 3

Additional physical testing was conducted on the inventive polymer-modified asphalt compositions to measure the durability and weatherability of the asphalt. One method of testing the durability of an asphalt composition is known as a "spark test," outlined in ASTM D1670. The spark test measures the extent of cracking and/or pitting of asphalt films to determine the extent of deterioration that occurs due to weathering. Various asphalt compositions were applied to an electrically conductive backing, such as an aluminum panel, and exposed to accelerated weathering caused by UV lighting and controlled conditions of humidity, moisture, and temperature. Throughout the weathering, the asphalt film may crack, which will expose the aluminum backing. A spark probe is then used to conduct a current in various locations of the panel. The probe will be able to conduct a current at any point in the asphalt film that has cracked in response to the weathering. Conventional coating asphalts are desired to pass 60 days or cycles of accelerated weathering prior to showing signs of degradation.

The results of the spark test indicated that the addition of ethylene bistearamide (EBS) as the secondary additive greatly improved the SBS polymer modified coating's resistance to the effects of UV light and heat, yielding a coating that performed essentially as well as conventional oxidized asphalt coating at the same application levels under the same test conditions.

Figure 9:
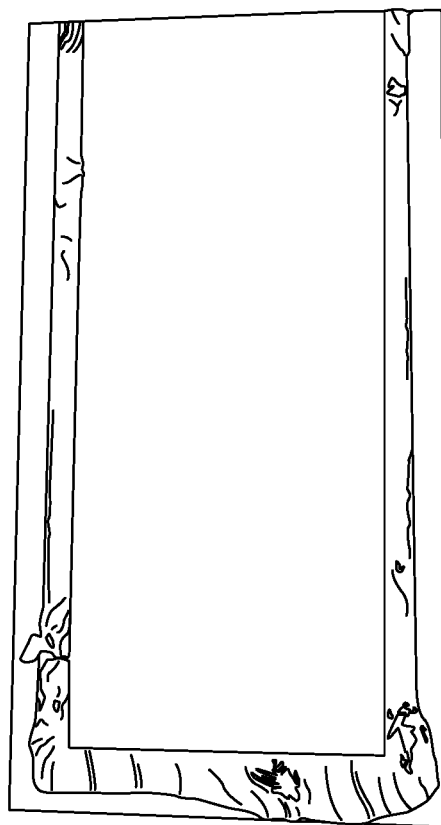
FIG. 9 illustrates an aluminum panel coated with a conventional oxidized polymer modified asphalt composition, after being exposed to accelerated weathering caused by UV lighting and controlled conditions of humidity, moisture, and temperature.
Figure 10:
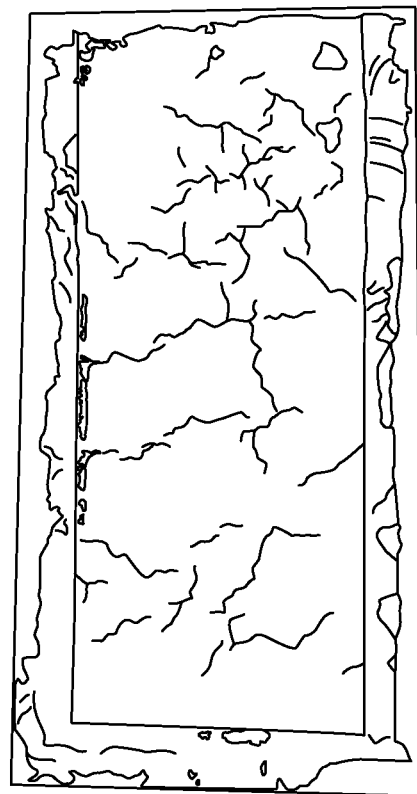
FIG. 10 illustrates an aluminum panel coated with a non-oxidized polymer modified asphalt composition that includes a secondary additive in accordance with the present inventive concepts, after being exposed to accelerated weathering caused by UV lighting and controlled conditions of humidity, moisture, and temperature.

FIG. 9 illustrates an aluminum panel substrate coated with a conventional oxidized asphalt coating composition. The coating composition lasted 108.5 days in the weatherometer, before failure (defined as the appearance of cracks over at least 10% of the panel). Similarly FIG. 10 illustrates an aluminum panel coated with a polymer modified coating asphalt composition in accordance with the present inventive concepts that includes 5 weight percent of Calprene 411 polymer (70/30 butadiene/styrene thermoplastic copolymer) and 3.0 weight percent of Lonza EBS wax. The coating composition in FIG. 10 lasted 94.4 days prior to failure, which passes the desired weathering parameters in the industry.

Figure 11:
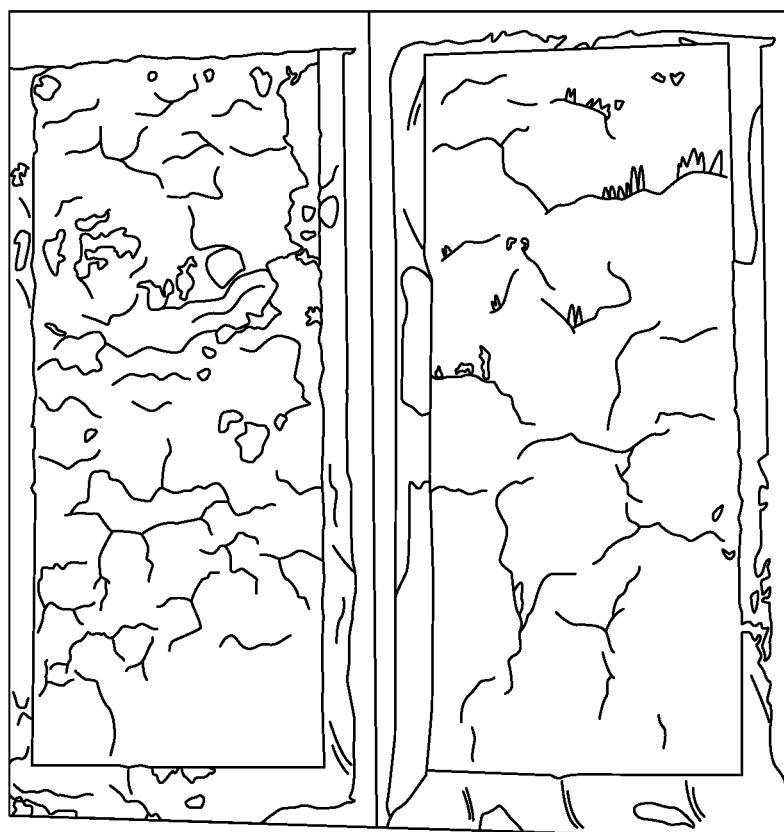
FIG. 11 illustrates two aluminum panels coated with a non-oxidized polymer modified asphalt composition without a secondary additive, after being exposed to accelerated weathering caused by UV lighting and controlled conditions of humidity, moisture, and temperature.
Figure 12:
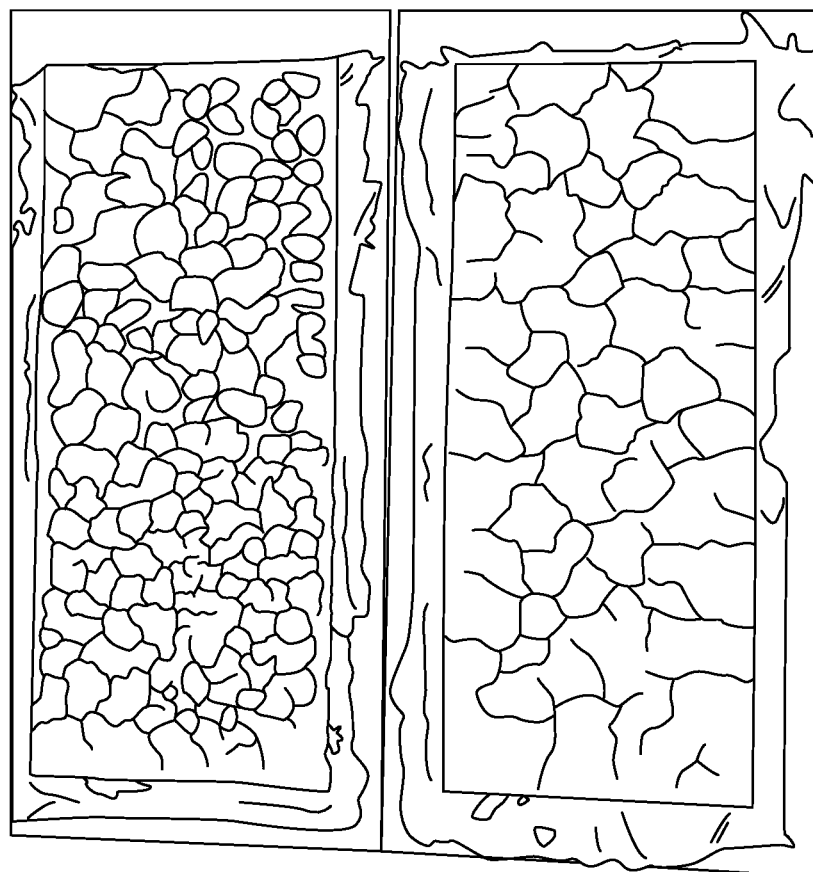
FIG. 12 illustrates two aluminum panels coated with a non-oxidized polymer modified asphalt composition with a polyethylene wax additive, after being exposed to accelerated weathering caused by UV lighting and controlled conditions of humidity, moisture, and temperature.

FIGS. 11 and 12 illustrate the weatherometer results based on an asphalt coating composition comprising non-oxidized asphalt. FIG. 11 illustrates an aluminum panel substrate coated with a non-oxidized asphalt modified with 6.6 weight percent Calprene 411 only, after 14 days of weathering. The samples in FIG. 11 failed after 14 days in the weatherometer. Similarly, FIG. 12 illustrates aluminum panel substrates coated with a non-oxidized asphalt modified with 5% Calprene 411 and 3.0 wt. % of VestoWax, which is a polyethylene wax. The samples in FIG. 12 failed after 14 days in the weatherometer. Accordingly, it can be seen that not every secondary additive will provide improved weathering properties. It has been discovered that the use of EBS and/or salts of animal or vegetable fatty acid esters as secondary additives surprisingly provide this added improvement.

Table 13, below, provides weatherometer results comparing the weatherability of a 100% oxidized coating asphalt composition (Sample A), with compositions that comprise non-oxidized paving grade asphalt (PG 64-22), along with a radial SBS additive and 2 or 3 wt. % of a wax additive. The results provide the days to failure, which is defined as the number of days that the sample was in the weatherometer before at least 10% of the sample cracked. As illustrated below, Sample A (100% oxidized coating asphalt), was in the weatherometer for 108.5 days, prior to failure. In contrast, Samples B, C, E, and F, including non-oxidized paving grade asphalt and 5 or 6 wt. % radial SBS polymer additive, showed very low weatherability, with days to failure less than 23. When a secondary additive is included in an amount of 2.0 or 3.0 wt. %, the weatherability increased to at least 50 days, in some instances at least 78 days, and in some instances at least 110 days. In Examples J and M, the samples including non-oxidized paving grade asphalt, 6.0 wt. % radial SBS polymer, and 2.0 wt. % wax demonstrated a weatherability greater than 130 days until failure, which is significantly improved over both oxidized coating asphalt compositions and non-oxidized paving grade asphalt with only radial SBS additive compositions.

TABLE 13

| | A | B | C | D | E | F | G | H | I | J | K | L | M |
|---|---|---|---|---|---|---|---|---|---|---|---|---|---|
| Oxidized asphalt | 100% | | | | | | | | | | | | |
| PG 64-22 | | 93.4% | 92% | 92% | | 92% | 92% | 92% | 92% | 92% | 92% | 92% | 92% |
| PG 67-22 | | | | | 94% | | | | | | | | |
| Radial SBS | | 6.6 | 5% | 5% | 6% | 5% | 5% | 6% | 6% | 6% | 6% | 6% | 6% |
| EBS wax | | | | 3% | | | 3% | 2% | 2% | 2% | | | |
| Vistowax | | | | | | | | | | | | | |
| Sasobit wax | | | | | | | | | | | 2% | 2% | 2% |
| Days to Failure | 108.5 | 14 | 14 | 94.4 | 22.8 | 22.8 | 78 | 86.4 | 79.8 | 130+ | 53.82 | 112.8 | 130+ |

Further physical testing was conducted on the inventive polymer-modified asphalt compositions to measure the compositions' ability to adhere and maintain granules on a shingle. Granule adhesion is tested according to ASTM D4977 (the "scrub test"). The various asphalt composition according to Tables 14 and 15 were prepared and applied to a reinforcement material. Granules were then applied to each sample and the samples were scrubbed using a steel bristled brush at various press pressures. The surfaces of each sample were then scrubbed using a steel bristled brush. The shingle samples were weighed before and after the scrub test and Tables 14 and 15 report the average weight loss for each sample. PG 64-22 Whiting is a paving grade asphalt binder commercially available from BP. EBS wax is a low-density polyethylene wax (N,N' Ethylene Bisstearamide) commercially available from Lonza.

TABLE 15

| | Oxidized Asphalt Coating | PG 64-22 with 6.0 wt. % SBS and 2.0 wt. % Fisher Tropsch wax (Sasobit wax) |
|---|---|---|
| Average mass loss | 0.768 g | 0.15 g |
| Std. Deviation | 0.2289 | 0.0365 |

Enhanced Performance of Polymer and Secondary Additive Modified Asphalt Shingle Having a Reinforcement Material In one exemplary embodiment, a reinforcement material 19, such as any of the reinforcements materials described above, and a polymer modified asphalt, such as any of the polymer modified asphalts described above, are selected and combined in a shingle to enhance the mechanical properties of the shingle. For example, the shingle with reinforcement material 19 and polymer modified asphalt can have enhanced properties compared to shingles having the same reinforcement, but the shingle is made with an oxidized asphalt (i.e. not a polymer modified asphalt). The shingle can comprise one or more of any of the reinforcement materials described herein and one or more of any of the polymer modified asphalt compositions disclosed herein.

In one exemplary embodiment, the reinforcement material 19 of the improved polymer modified asphalt/reinforcement material shingle can be formed from woven polyester fabric. In one exemplary embodiment, the shingles having the reinforcement material 19 and a polymer modified asphalt and a compared otherwise identical shingle having

TABLE 14

| | Coating Description | | | | | | | | | |
|---|---|---|---|---|---|---|---|---|---|---|
| | Sample 1: Oxidized Asphalt Coating | | | Sample 2: PG 64-22 + 6.6 wt. % SBS | | | Sample 3: PG 64-22 + 5 wt. % SBS + 3 wt. % EBS | Sample 4: PG 64-22 + 5 wt. % SBS + 3 wt. % Vistawax | | |
| Press (lb) | 20 | 50 | 80 | 20 | 50 | 80 | 50 | 20 | 50 | 80 |
| Average (g) | 1.50 | 0.70 | 0.53 | 1.05 | 0.54 | 0.42 | 0.75 | 1.28 | 0.87 | 0.68 |
| Stdev | 0.35 | 0.13 | 0.14 | 0.35 | 0.15 | 0.09 | 0.15 | 0.41 | 0.22 | 0.19 |

Table—illustrates that at scrub press pressures of 20 lbs, Sample 4 resulted in only 1.28 g weight loss, while the oxidized asphalt coating demonstrated a weight loss of 1.50 g.

However, as shown below in Table 3, a secondary additive concentration at 2.0 wt. % appears to provide an unexpected improvement in granule adhesion, compared to an oxidized asphalt coating composition, at the same scrub test pressure.

the same reinforcement material and a conventional oxidized asphalt have a weight of 190-230, such as 200-220, such as 210-215, such as an approximate weight of 213 lbs per square. In one exemplary embodiment, the polymer modified asphalt comprises (prior to addition of any filler):

85-99%, such as 87-97%, such as 89-95%, such as 91-93%, such as about 92% Asphalt;

0-13%, such as 1-11%, such as 3-9%, such as 5-7%, such as about 6% styrene-butadiene rubber (SBS); and 0-6%, such as 0.5-5%, such as 1-3%, such as 1.9-2.4%, such as about 2% wax, such as any of the waxes disclosed herein. In one exemplary embodiment, the wax is a polyethylene wax.

Optionally, a filler can be included in the polymer modified asphalt (and the same amount in the compared oxidized asphalt shingle) of the shingle with improved nail pull-through resistance. The filler can take a wide variety of different forms. For example, the filler can be any of the fillers disclosed in the present patent application. A wide different amounts of filler can be included in the polymer modified asphalt. For example, the filler to polymer modified asphalt blend can be (based on the total weight of the polymer modified asphalt and filler blend):

0-100%, such as 20-50%, such as 25-45%, such as 30-40%, such as about 34% polymer modified asphalt; and 0-100%, such as 50-80%, such as 55-70%, such as about 66% filler. In one exemplary embodiment, the filler is a limestone filler.

Enhanced Nail Pull for Polymer and Secondary Additive Modified Asphalt Shingle Having a Reinforcement Material In one exemplary embodiment, the nail pull-through resistance of a shingle having a reinforcement material 19, such as any of the reinforcement materials described above, and a polymer modified asphalt, such as any of the polymer modified asphalts described above is greater than the nail pull-through resistance of an otherwise identical shingle made with a conventional oxidized asphalt (i.e. not a polymer modified asphalt).

Improved nail pull-through resistance values of a shingle having a reinforcement material 19, such as any of the reinforcement materials described above, and a polymer modified asphalt, such as any of the polymer modified asphalts described above v. a shingle having the same reinforcement material and a conventional oxidized asphalt have been demonstrated using a modified version of the nail pull-through test prescribed by ASTM test standard D3462, wherein the test fixture has an opening that has been reduced from a 2.5 inch diameter to a 2.0 inch diameter. For example, nail pull-through resistance values of a shingle having a reinforcement material 19 and a polymer modified asphalt v. an otherwise identical shingle having the same reinforcement material and a conventional oxidized asphalt can be a greater than 5% nail pull through force increase, a greater than 10% nail pull through force increase, a greater than 12% nail pull through force increase, at least a 14% nail pull through force increase, or an at least about 15% nail pull through force increase. In one exemplary embodiment, the nail pull resistance of the improved polymer modified asphalt/reinforcement material shingle is between 63-74, such as 65-71 lbf, such as 67-69 lbf, such as about 68 lbf. In one exemplary embodiment, the enhanced nail pull resistance described above is at room temperature (for both the PMA+Reinforcement shingle and the compared conventional asphalt plus reinforcement shingle), such as 73 degrees F. or about 73 degrees F.

Enhanced Longitudinal Adhesion for Polymer and Secondary Additive Modified Asphalt Shingle Having A Reinforcement Material In one exemplary embodiment, the longitudinal adhesion of a shingle having a reinforcement material 19, such as any of the reinforcement materials described above, and a polymer modified asphalt, such as any of the polymer modified asphalts described above is greater than the longitudinal adhesion of an otherwise identical shingle made with a conventional oxidized asphalt (i.e. not a polymer modified asphalt). As used herein, the term "longitudinal adhesion" refers to the force applied in the machine direction (i.e. in the direction of the length of the reinforcement material) required to peel the reinforcement material off of the shingle.

Figure 13:
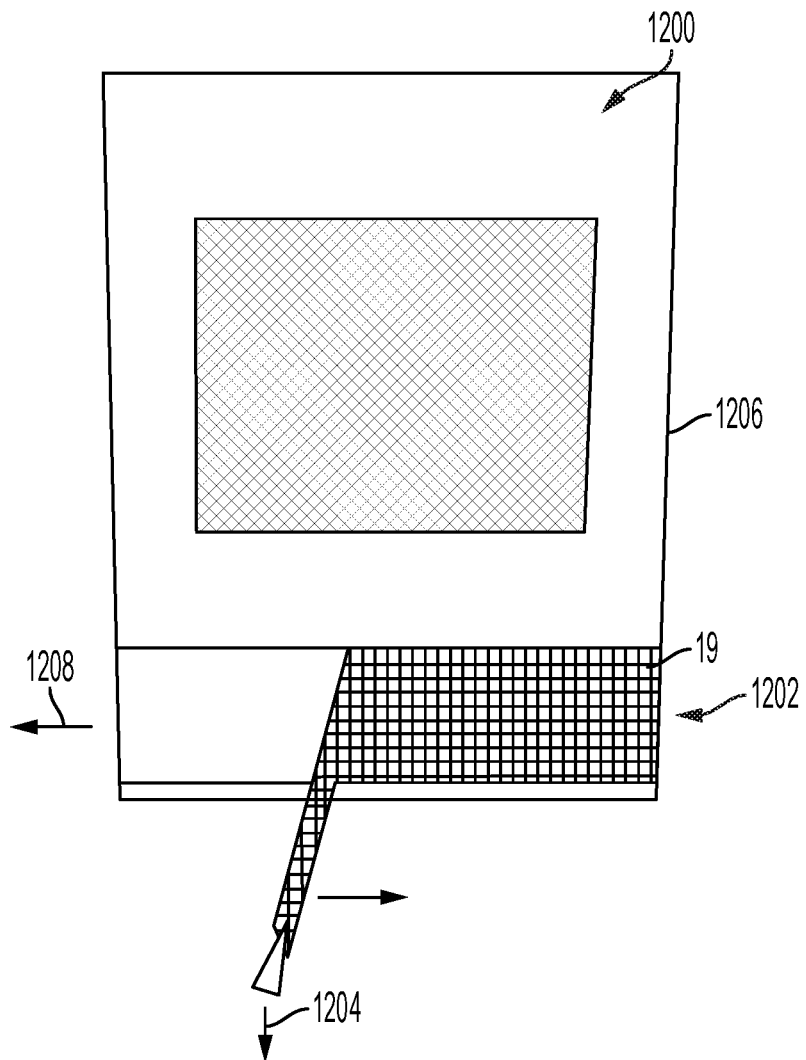
FIGS. 13 and 14 schematically illustrate a test of longitudinal adhesion of a nail zone reinforcement material to a shingle.
Figure 14:
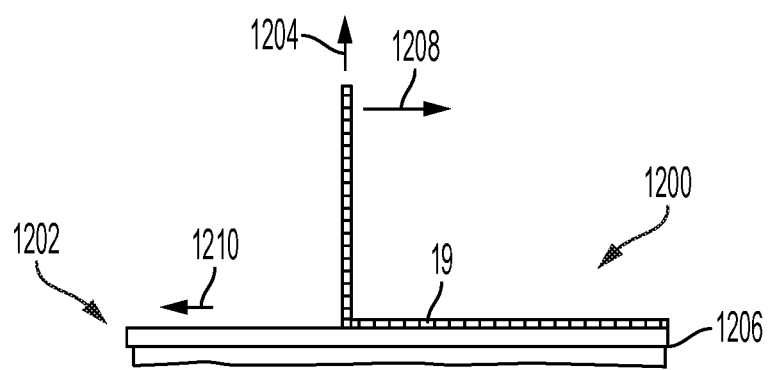

Improved longitudinal adhesion values of a shingle having a reinforcement material 19, such as any of the reinforcement materials described above, and a polymer modified asphalt, such as any of the polymer modified asphalts described above v. a shingle having the same reinforcement material and a conventional oxidized asphalt have been demonstrated using a modified version of the peel test prescribed by ASTM test standard D1876. For example, referring to FIGS. 13 and 14, a sample 1200 is cut from a shingle. The sample 1200 can be cut along the common bond area 1202 of the shingle, with the reinforcement 19 running through the center of the sample 1200. Approximately 1" of the reinforcement material 19 is pulled up as indicated by arrow 1204. The reinforcement material 19 can be creased to form a T-shaped sample (See FIG. 14). The upward extending reinforcement material 19 and the shingle material 1206 are pulled relatively apart in the machine direction indicated by arrows 1208, 1210 to peel the reinforcement material 19 off the shingle material 1206. For example, the reinforcement material 19 and the shingle material 1206 can be pulled relatively apart in the machine direction at a rate of 12"/min. The reinforcement material 19 and the shingle material 1206 can be pulled apart for a total pull length of 3.5". In one exemplary embodiment, the average pull force is computed using the pull force data from a 1" pull length mark to a 2" pull length mark. This area (between 1" and 2" of pull) is relatively steady and not influenced by contact with the clamps that hold the reinforcement material 19 and the shingle material 1206. For example, an increase in longitudinal adhesion values of a shingle having a reinforcement material 19 and a polymer modified asphalt v. an otherwise identical shingle having the same reinforcement material and a conventional oxidized asphalt can be a greater than 10% increase in pull force, a greater than 20% increase in pull force, a greater than 30% increase in pull force, a greater than 40% increase in pull force, or an at least about 45% increase in pull force. In one exemplary embodiment, the longitudinal adhesion of the improved polymer modified asphalt/reinforcement material shingle is greater than 1.25 lbf, such as between 1.25 and 2.75 lbf, such as 1.5-2.5 lbf, such as 1.75-2.25 lbf, such as about 2 lbf. In one exemplary embodiment, the enhanced longitudinal adhesion described above is at room temperature (for both the PMA+Reinforcement shingle and the compared conventional asphalt plus reinforcement shingle), such as 73 degrees F. or about 73 degrees F.

Enhanced Transverse Adhesion for Polymer and Secondary Additive Modified Asphalt Shingle Having A Reinforcement Material In one exemplary embodiment, the transverse adhesion of a shingle having a reinforcement material 19, such as any of the reinforcement materials described above, and a polymer modified asphalt, such as any of the polymer modified asphalts described above is greater than the transverse adhesion of an otherwise identical shingle made with a conventional oxidized asphalt (i.e. not a polymer modified asphalt). As used herein, the term "transverse adhesion" refers to the force applied in the cross-machine direction (i.e. in the direction perpendicular to the length of the reinforcement material) required to peel the reinforcement material off of the shingle.

Figure 15:
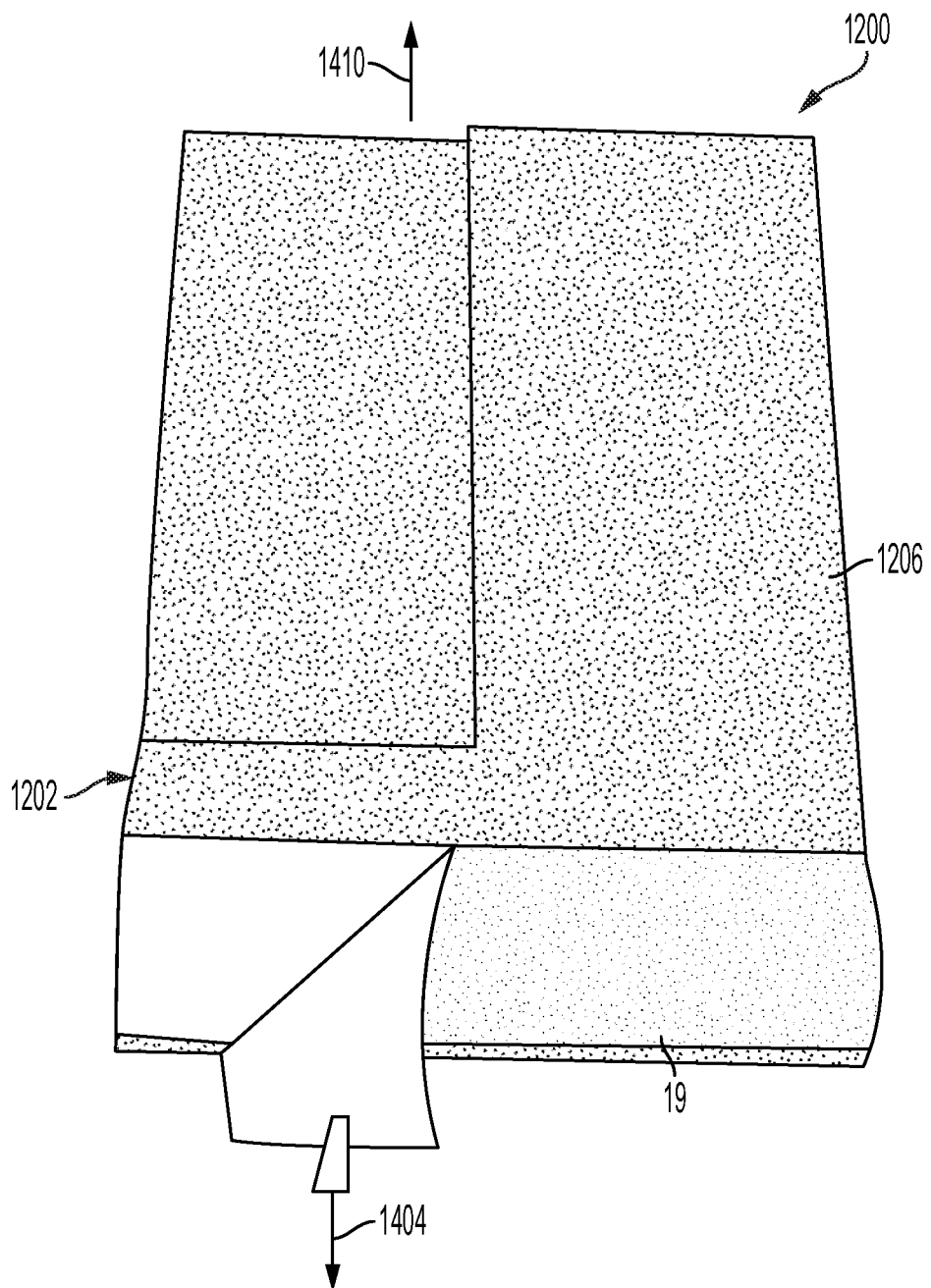
FIG. 15 schematically illustrates a test of transverse adhesion of a nail zone reinforcement material to a shingle.

Improved transverse adhesion values of a shingle having a reinforcement material 19, such as any of the reinforcement materials described above, and a polymer modified asphalt, such as any of the polymer modified asphalts described above v. a shingle having the same reinforcement material and a conventional oxidized asphalt have been demonstrated using a modified version of the peel test prescribed by ASTM test standard D1876. For example, referring to FIG. 15, a sample 1200 is cut from a shingle. The sample 1200 can be cut along the common bond area 1202 of the shingle, with the reinforcement material 19 running through the center of the sample 1200. Approximately 1" of the reinforcement material 19 is pulled up and folded down at a 90 degree angle to the reinforcement material 19 remaining on the shingle as indicated by arrow 1404. The reinforcement material 19 and the shingle material 1206 are pulled relatively apart in the cross-machine direction indicated by arrows 1404, 1410 to peel the reinforcement material 19 off of the shingle material 1206. For example, the reinforcement material 19 and the shingle material 1206 can be pulled relatively apart in the cross-machine direction at a rate of 12"/min. The reinforcement material 19 and the shingle material 1206 can be pulled apart for a total pull length of 3.5". In one exemplary embodiment, the average pull force is computed using the pull force data from a 1" pull length mark to a 1.5" pull length mark. This area (between 1" and 1.5" of pull) is relatively steady. For example, transverse adhesion values of a shingle having a reinforcement material 19 and a polymer modified asphalt v. an otherwise identical shingle having the same reinforcement material and a conventional oxidized asphalt can be a greater than 5% increase in pull force, a greater than 10% increase in pull force, a greater than 15% increase in pull force, or an at least about 19% increase in pull force. In one exemplary embodiment, the transverse adhesion of the improved polymer modified asphalt/reinforcement material shingle is greater than 5 lbf, such as between 5 and 10 lbf, such as 6-9 lbf, such as 7.0-7.5 lbf, such as about 7.3 lbf. In one exemplary embodiment, the enhanced transverse adhesion described above is at room temperature (for both the PMA+Reinforcement shingle and the compared conventional asphalt plus reinforcement shingle), such as 73 degrees F. or about 73 degrees F.

Applicants have found that transverse adhesion can be an indicator of enhanced cuttability. Increased transverse adhesion correlates to enhanced (easier/with less force exerted) cutting of the shingle through the area of the shingle with the reinforcement material 19.

Enhanced Cuttability for Polymer and Secondary Additive Modified Asphalt Shingle Having a Reinforcement Material In one exemplary embodiment, the cuttability at elevated temperatures, such as 70 degrees C., of a shingle having a reinforcement material 19, such as any of the reinforcement materials described above, and a polymer modified asphalt, such as any of the polymer modified asphalts described above is enhanced compared the cuttability of an otherwise identical shingle made with a conventional oxidized asphalt (i.e. not a polymer modified asphalt). As used herein, the term "cuttability" refers to the force applied by a knife in the cross-machine direction (i.e. in the direction perpendicular to the length of the reinforcement material) required to cut through the shingle material and reinforcement material. In this application, a lowering of the force needed to cut through the shingle material and the reinforcement material with the same cutting instrument is enhanced cuttability.

Figure 17:
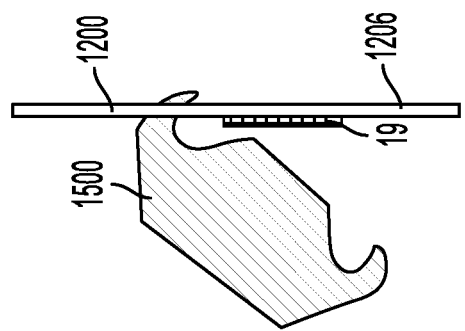
FIGS. 16 and 17 schematically illustrate a cutting test through shingle material (one or two layers) and nail zone reinforcement material on the shingle material.
Figure 16:
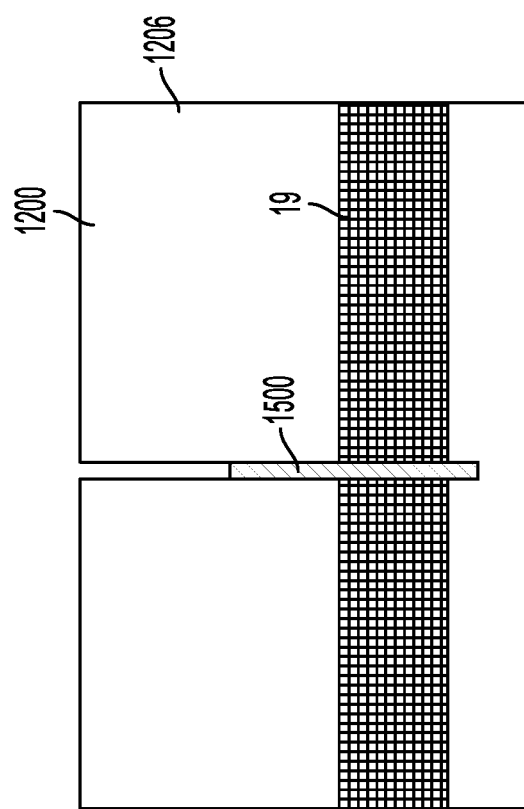

Improved cuttability of a shingle having a reinforcement material 19, such as any of the reinforcement materials described above, and a polymer modified asphalt, such as any of the polymer modified asphalts described above v. a shingle having the same reinforcement material and a conventional oxidized asphalt have been demonstrated using a test as described below. For example, referring to FIGS. 16 and 17, a sample 1200 is cut from a shingle. The sample 1200 can be cut along the common bond area 1202 of the shingle, with the reinforcement material 19 running through the center of the sample 1200. The sample is heated in an oven to 70 degrees C. to thoroughly heat the sample (e.g. 1 hour). Immediately after heating the sample, a hook razor blade 1500 (such as a large hook razor blade, such as Stanley Part Number 11-983L) is oriented transverse to the sample 1200 and is placed in engagement with the sample. The hook razor blade can be positioned on top of the granules and the reinforcement material 19 as illustrated by FIG. 16. The hook razor blade 1500 is pulled across the reinforcement material 19 and the shingle material 1206 to cut the sample in half. For example, the hook razor blade 1500 can be pulled through the shingle at a rate of 20"/min. The average cutting force (i.e. pulling force applied between the hook razor blade and the sample) needed to cut each of the samples of a shingle having a reinforcement material 19 and a polymer modified asphalt v. samples of an otherwise identical shingle having the same reinforcement material and a conventional oxidized asphalt can be at least a 5% reduction in cutting force, at least a 10% reduction in cutting force, at least a 15% reduction in cutting force, at least a 20% reduction in cutting force, at least a 25% reduction in cutting force, or an at least about 30% reduction in cutting force. In one exemplary embodiment, the cutting force needed to cut the 70 degree C. sample of the improved polymer modified asphalt/reinforcement material shingle is less than 65 Newtons, such as between 20 and 65 Newtons, such as 30-55 Newtons, such as 35-50 Newtons, such as 45-48 Newtons, such as about 47 Newtons. In one exemplary embodiment, the cutting force needed to cut the 70 degree C. sample of the polymer modified asphalt/reinforcement material shingle is reduced as compared to an otherwise identical shingle having the same reinforcement material and a conventional oxidized asphalt is reduced by at least 5 Newtons, such as between 5 and 35 Newtons, such as 10-30 Newtons, such as 15-25 Newtons, such as 18-22 Newtons, such as about 20 Newtons.

Enhanced Cuttability for Polymer and Secondary Additive Modified Asphalt Shingle Having a Reinforcement Material In one exemplary embodiment, the cuttability at room temperature, such as 73 degrees F., of a shingle having a reinforcement material 19, such as any of the reinforcement materials described above, and a polymer modified asphalt, such as any of the polymer modified asphalts described above is enhanced compared the cuttability of an otherwise identical shingle made with a conventional oxidized asphalt (i.e. not a polymer modified asphalt).

Improved cuttability of a shingle having a reinforcement material 19, such as any of the reinforcements materials described above, and a polymer modified asphalt, such as any of the polymer modified asphalts described above v. a shingle having the same reinforcement material and a conventional oxidized asphalt have been demonstrated using a test as described below. For example, referring to FIGS. 15 and 16, a sample 1200 is cut from a shingle. The sample 1200 can be cut along the common bond area 1202 of the shingle, with the reinforcement material 19 running through the center of the sample 1200. The sample and ambient temperature are room temperature, such as about 73 degrees F. A hook razor blade 1500 (such as a large hook razor blade, such as Stanley Part Number 11-983L) is oriented transverse to the sample 1200 and is placed in engagement with the sample. The hook razor blade can be positioned on top of the granules and the reinforcement material 19 as illustrated by FIG. 16. The hook razor blade 1500 is pulled across the reinforcement material 19 and the shingle material 1206 to cut the sample in half. For example, the hook razor blade 1500 can be pulled through the shingle at a rate of 20"/min. The average cutting force (i.e. pulling force applied between the hook razor blade and the sample) needed to cut each of the samples of a shingle having a reinforcement material 19 and a polymer modified asphalt v. samples of an otherwise identical shingle having the same reinforcement material and a conventional oxidized asphalt can be at least a 5% reduction in cutting force, at least a 10% reduction in cutting force, at least a 5% reduction in cutting force, at least a 7.5% reduction in cutting force, or an at least about 10% reduction in cutting force. In one exemplary embodiment, the cutting force needed to cut the 73 degree F. sample of the improved polymer modified asphalt/reinforcement material shingle is less than 70 Newtons, such as between 20 and 70 Newtons, such as 40-65 Newtons, such as 45-60 Newtons, such as 55-59 Newtons, such as about 57.5 Newtons. In one exemplary embodiment, the cutting force needed to cut the 73 degree F. sample of the polymer modified asphalt/reinforcement material shingle is reduced as compared to an otherwise identical shingle having the same reinforcement material and a conventional oxidized asphalt is reduced by at least 5 Newtons, such as between 5 and 12.5 Newtons, such as 6-10 Newtons, such as 7-9 Newtons, such as about 7.5 Newtons.

Optional Treatment of the Reinforcement Material to Enhance Bonding Between the Reinforcement Material and Polymer Modified Asphalt and/or Between the Reinforcement Material and Sealant of an Overlying Shingle In one exemplary embodiment, the reinforcement material is constructed to provide better adhesion of the reinforcement 19 to the polymer modified asphalt and/or better adhesion of the reinforcement 19 to the sealant or adhesive of an overlying shingle on the roof. In some configurations, sealant is provided on the bottom surface of the tabs of the shingle at a lower end of the tabs as described above. When the shingles are installed on a roof, the sealant on the bottom surfaces of the tabs of an overlying course of shingles bonds with the reinforcement 19 in the nail zone of an underlying course of shingles. This bonding connects each overlying course of shingles to each underlying course of shingles. The reinforcement 19 can be modified in a wide variety of different ways to enhance adhesion of the reinforcement 19 to the polymer modified asphalt of the shingle and/or adhesion of the reinforcement 19 to the sealant. For example, the reinforcement 19 can be modified by a surface treatment or chemistry that is pre-applied, post-applied or molecularly integrated to the reinforcement material. In one exemplary embodiment, the reinforcement material 19 can be modified to enhance adhesion of the sealant to reinforcement material 19 in cold temperatures, such as temperatures below 40 degrees F. The reinforcement materials 19 that are modified to enhance bonding of the reinforcement material 19 to the polymer modified asphalt and/or enhance adhesion of the reinforcement 19 to the sealant or adhesive of an overlying shingle can take a wide variety of different forms. For example, the reinforcement materials can be any of the reinforcement materials 19 disclosed herein, including but not limited to woven or non-woven polyester tapes, and other woven and nonwoven polymer tapes.

One option for providing better adhesion of the reinforcement 19 to the polymer modified asphalt and/or better adhesion of the reinforcement 19 to the sealant or adhesive of an overlying shingle on the roof is to integrate an adhesion promoting chemical into the manufacturing process of the reinforcement material. The adhesion promoting chemical can take a wide variety of different forms and can be integrated into the manufacturing process of the reinforcing material in a wide variety of different ways. In one exemplary embodiment, the adhesion promoting chemical is an input material that is blended with other materials, such as polyethylene or any of the other reinforcement materials disclosed herein, prior to extrusion of the reinforcement material. The adhesion promoting chemical can be any material that enhances bonding between a tape, such as a polyethylene or any of the other reinforcement materials disclosed herein, and polymer modified asphalt, such as any of the polymer modified asphalts disclosed herein and/or a polymer modified asphalt sealant. For example, the reinforcement material can be a woven or non-woven tape formed from strands, fibers, and/or tapes and the adhesion promoting chemical is blended with the material that forms the strands, before the strands, fibers, and/or tapes are extruded.

One option for providing better adhesion of the reinforcement 19 to the polymer modified asphalt and/or better adhesion of the reinforcement 19 to the sealant or adhesive of an overlying shingle on the roof is to coat individual strands, fibers, and/or tapes of a woven or non-woven reinforcement material with an adhesion promoting chemistry after extrusion of the strands, fibers, and/or tapes. The adhesion promoting chemical can take a wide variety of different forms and can be applied to strands, fibers, and/or tape(s) of the reinforcing material in a wide variety of different ways. The adhesion promoting chemical can be any material that enhances bonding between a tape, such as a polyethylene or any of the other reinforcement materials disclosed herein, and polymer modified asphalt, such as any of the polymer modified asphalts disclosed herein and/or a polymer modified asphalt sealant.

One option for providing better adhesion of the reinforcement 19 to the polymer modified asphalt and/or better adhesion of the reinforcement 19 to the sealant or adhesive of an overlying shingle on the roof is to add an adhesive promoting chemistry during the chemical, thermal, mechanical and/or solvent bonding together of strands, fibers, and/or tapes of aa reinforcement material 19. The adhesion promoting chemical can take a wide variety of different forms and can be applied during bonding together of the strands, fibers, and/or tapes of the reinforcing material in a wide variety of different ways. The adhesion promoting chemical can be any material that enhances bonding between a tape, such as a polyethylene or any of the other reinforcement materials disclosed herein, and polymer modified asphalt, such as any of the polymer modified asphalts disclosed herein and/or a polymer modified asphalt sealant.

One option for providing better adhesion of the reinforcement 19 to the polymer modified asphalt and/or better adhesion of the reinforcement 19 to the sealant or adhesive of an overlying shingle on the roof is to run finished reinforcement material, such as a tape, through a secondary, adhesion enhancing process. The secondary, adhesion promoting process can take a wide variety of different forms. For example, the side of a finished or previously manufactured tape that faces the polymer modified asphalt of the shingle, the side of the tape that faces the sealant of an overlying shingle or both sides of the tape can be subjected to a secondary, adhesion promoting process. The secondary, adhesion promoting process can take a wide variety of different forms. The side of a finished or previously manufactured tape that faces the polymer modified asphalt of the shingle, the side of the tape that faces the sealant of an overlying shingle or both sides can be sprayed, bathed, corona treated, painted, powder coated, mercerizing, or other chemical finishing process with an adhesion promoting chemistry or secondary coating material and/or roughened, perforated, or otherwise mechanically processed. In one exemplary embodiment, the side of the tape that faces the polymer modified asphalt of the shingle is subjected to one secondary, adhesion promoting process and the side of the tape that faces the sealant of an overlying shingle is subjected to another secondary, adhesion promoting process. In one exemplary embodiment, a secondary layer of material, such as a release tape, can be applied to the surface of the tape. The secondary layer of material can be removed to expose the adhesive promoting layer or surface on the reinforcement material during cold weather installations, such as installations that are on days that are colder than 50 degrees F., such as days that are colder than 40 degrees F.

One option for providing better adhesion of the reinforcement 19 to the sealant or adhesive of an overlying shingle on the roof is to spray or paint a liquid or other phase material to the tape on the surface of the tape that faces the sealant of an overlying shingle in the field during cold temperature installs, such as when outside temperatures are less than 40 degrees F. The sprayed or painted material can promote adhesion of the sealant to the tape in a variety of different ways. The sprayed or painted material can be a one part adhesive material or a two part adhesive material. A two part adhesive material can have a first part applied to the tape and the other part applied to the sealant of the overlying shingle.

One option for providing better adhesion of the reinforcement 19 to the polymer modified asphalt and/or better adhesion of the reinforcement 19 to the sealant or adhesive of an overlying shingle on the roof is to make the reinforcement material from a PET material and modify the surfaces of the PET through NaOH modification. Increasing the surface roughness and the polarity of the surface through NaOH modification in turn increases adhesion due to an increase in carboxylic acid groups.

One option for providing better adhesion of the reinforcement 19 to the polymer modified asphalt is to tailor the polymer modified asphalt coating to increase the adhesion between reinforcement material and the polymer modified asphalt shingle filled coating. The polymer modified asphalt coating can be formulated to achieve synergistic effects between coating performance and increased adhesion (rheological properties that improve both shingle aspects).

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions.

Although several exemplary embodiments of the present invention have been described herein, it should be appreciated that many modifications can be made without departing from the spirit and scope of the general inventive concepts. All such modifications are intended to be included within the scope of this invention and the related general inventive concepts.

The invention claimed is:

1. A roofing shingle comprising:
   a substrate having a first surface and an opposing second surface;
   a polymer-modified asphalt coating on the first surface of the substrate, wherein the polymer-modified asphalt comprises:
   from 40 wt. % to 80 wt. % of a filler, based on the total weight of the polymer-modified asphalt coating,
   from 1 wt. % to 13 wt. % of a polymer additive, based on the total weight of a non-filler portion of the polymer-modified asphalt coating; and
   asphalt; and
   a strip of nail zone reinforcement material adhered to the polymer-modified asphalt coating, the strip of nail zone reinforcement material having a width of 0.5 inches to 2.0 inches and a length that is greater than the width and runs in a machine direction of the shingle,
   wherein the roofing shingle meets or surpasses the UL2218 Class 3 impact resistance standard, wherein the roofing shingle is free from an integrated polymeric backing that imparts impact resistance to the roofing shingle, and
   wherein a cutting force required to cut the shingle through the nail zone reinforcement material is less than a cutting force required to cut through a nail zone reinforcement material area of an otherwise identical shingle having the same nail zone reinforcement material and an oxidized asphalt excluding the polymer additive.

2. The roofing shingle of claim 1, wherein the strip of nail zone reinforcement material is a woven or nonwoven fabric.

3. The roofing shingle of claim 1, wherein the polymer-modified asphalt includes the polymer additive in an amount from 2 wt. % to 7 wt. % based on the total weight of the non-filler portion of the polymer-modified asphalt coating.

4. The roofing shingle of claim 1, wherein the polymer additive is selected from the group consisting of atactic polypropylene, isotactic polypropylene, styrene-butadiene block copolymer, chloroprene rubber, amorphous polyolefin, styrene butadiene latex, natural and reclaimed rubbers, butadiene rubber, acrylonitrile-butadiene rubber, isoprene rubber, styrene-polyisoprene, butyl rubber, ethylene propylene rubber, ethylene propylene diene monomer rubber, polyisobutylene, chlorinated polyethylene (CPE), styrene ethylene-butylene-styrene, hydrogenated styrene butadiene block copolymer, vinylacetate/polyethylene, and mixtures thereof.

5. The roofing shingle of claim 4, wherein the polymer additive is selected from the group consisting of styrene-butadiene rubber, styrene ethylene-butylene-styrene, reclaimed rubber, and mixtures thereof.

6. The roofing shingle of claim 1, wherein the polymer modified asphalt further includes a viscosity reducing agent selected from the group consisting of a wax, a salt of a fatty acid ester, an amide of a fatty acid, and mixtures thereof.

7. The roofing shingle of claim 1, wherein a longitudinal adhesion of the strip of nail zone reinforcement material to the polymer-modified asphalt coating is greater than a longitudinal adhesion of an otherwise identical shingle having the same strip of nail zone reinforcement material and an oxidized asphalt without the polymer additive.

8. The roofing shingle of claim 1, wherein a longitudinal adhesion of the strip of nail zone reinforcement material to the polymer-modified asphalt coating is greater than 1.25 lbf.

9. The roofing shingle of claim 1, wherein a traverse adhesion of the strip of nail zone reinforcement material to the polymer-modified asphalt coating is greater than a traverse adhesion of an otherwise identical shingle having the same strip of nail zone reinforcement material and an oxidized asphalt without the polymer additive.

10. The roofing shingle of claim 1, wherein a transverse adhesion of the strip of nail zone reinforcing material to the polymer-modified asphalt coating is greater than 5 lbf.

11. The roofing shingle of claim 1, wherein the roofing shingle meets or surpasses the UL2218 Class 4 impact resistance standard.

12. The roofing shingle of claim 1, wherein the substrate includes a headlap portion, a tab portion, and a boundary where the headlap portion meets the tab portion, and the strip of nail zone reinforcement is located on the headlap portion a distance of 0.125 inches to 0.375 inches from the boundary where the headlap portion meets the tab portion.

13. A roofing shingle comprising:
an asphalt coated overlay sheet comprising a headlap portion and a tab portion;
an asphalt coated underlay sheet secured to the overlay sheet such that a region of the underlay sheet overlaps a region of the headlap portion of the overlay sheet;
a strip of nail zone reinforcement material adhered to the headlap portion of the overlay sheet; and
a plurality of granules adhered to the asphalt coated overlay sheet and to the asphalt coated underlay sheet,
wherein at least one of the asphalt coated overlay sheet and the asphalt coated underlay sheet include an asphalt coating that is a polymer-modified asphalt comprising:
from 40 wt. % to 80 wt. % of a filler, based on the total weight of the polymer-modified asphalt coating, and
from 1 wt. % to 13 wt. % of a polymer additive based on the total weight of the non-filler portion of the polymer-modified asphalt coating,
wherein the strip of nail zone reinforcement material is adhered to the overlay sheet through the adhesive nature of the asphalt coating,
wherein the strip of nail zone reinforcement material has a width and a length, and wherein the width is from 0.5 inches to 2.0 inches and the length is greater than the width and runs in a machine direction of the shingle,
wherein a longitudinal adhesion of the strip of nail zone reinforcement material to the polymer-modified asphalt coating is greater than a longitudinal adhesion of an otherwise identical shingle having the same strip of nail zone reinforcement material and an oxidized asphalt without the polymer additive;
wherein the roofing shingle meets or surpasses the UL2218 Class 3 impact resistance standard, and wherein the roofing shingle is free from an integrated polymeric backing that imparts impact resistance to the roofing shingle.

14. The roofing shingle of claim 13, wherein strip of nail zone reinforcement material is positioned on the headlap portion of the overlay sheet such that the nail zone reinforcement material is not over the region of the underlay sheet that overlaps a region of the headlap portion of the overlay sheet.

15. The roofing shingle of claim 13, wherein strip of nail zone reinforcement material is positioned on the headlap portion of the overlay sheet such that the nail zone reinforcement material is over the region of the underlay sheet that overlaps a region of the headlap portion of the overlay sheet.

16. The roofing shingle of claim 13, wherein the strip of nail zone reinforcement material is a woven or nonwoven fabric.

17. The roofing shingle of claim 13, wherein the polymer-modified asphalt includes the polymer additive in an amount from 2 wt. % to 7 wt. % based on the total weight of the non-filler portion of the polymer-modified asphalt coating.

18. The roofing shingle of claim 13, wherein the polymer additive is selected from the group consisting of atactic polypropylene, isotactic polypropylene, styrene-butadiene block copolymer, chloroprene rubber, amorphous polyolefin, styrene butadiene latex, natural and reclaimed rubbers, butadiene rubber, acrylonitrile-butadiene rubber, isoprene rubber, styrene-polyisoprene, butyl rubber, ethylene propylene rubber, ethylene propylene diene monomer rubber, polyisobutylene, chlorinated polyethylene (CPE), styrene ethylene-butylene-styrene, hydrogenated styrene butadiene block copolymer, vinylacetate/polyethylene, and mixtures thereof.

19. The roofing shingle of claim 13, wherein the polymer modified asphalt further includes a viscosity reducing agent selected from the group consisting of a wax, a salt of a fatty acid ester, an amide of a fatty acid, and mixtures thereof.

20. The roofing shingle of claim 13, wherein the polymer modified asphalt further includes a viscosity reducing agent and the viscosity reducing agent is selected from one or more of a wax, a salt of a fatty acid ester, and an amide of a fatty acid.

21. The roofing shingle of claim 13, wherein the longitudinal adhesion of the strip of nail zone reinforcement material to the polymer-modified asphalt coating is greater than 1.25 lbf.

22. The roofing shingle of claim 13, wherein a traverse adhesion of the strip of nail zone reinforcement material to the polymer-modified asphalt coating is greater than a traverse adhesion of an otherwise identical shingle having the same strip of nail zone reinforcement material and a conventional oxidized asphalt without the polymer additive.

23. The roofing shingle of claim 13, wherein a transverse adhesion of the strip of nail zone reinforcing material to the polymer-modified asphalt coating is greater than 5 lbf.

24. The roofing shingle of claim 13, wherein a cutting force required to cut the shingle through the nail zone reinforcement material is less than a cutting force required to cut through a nail zone reinforcement material area of an otherwise identical shingle having the same nail zone reinforcement material and an oxidized asphalt without the polymer additive.

* * * * *